United States Patent
Shimanaka et al.

(10) Patent No.: US 10,982,033 B2
(45) Date of Patent: Apr. 20, 2021

(54) POLYMER PRODUCTION METHOD AND RADICAL POLYMERIZATION INITIATING GROUP-CONTAINING COMPOUND

(71) Applicant: DAINICHISEIKA COLOR & CHEMICALS MFG. CO., LTD., Tokyo (JP)

(72) Inventors: Hiroyuki Shimanaka, Tokyo (JP); Yoichi Tagi, Tokyo (JP); Yoshikazu Murakami, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 16/066,972

(22) PCT Filed: Feb. 22, 2017

(86) PCT No.: PCT/JP2017/006459
§ 371 (c)(1),
(2) Date: Jun. 28, 2018

(87) PCT Pub. No.: WO2017/150287
PCT Pub. Date: Sep. 8, 2017

(65) Prior Publication Data
US 2019/0002619 A1 Jan. 3, 2019

(30) Foreign Application Priority Data

Feb. 29, 2016 (JP) .............................. JP2016-037274
Oct. 14, 2016 (JP) .............................. JP2016-202901

(51) Int. Cl.
*C08F 293/00* (2006.01)
*C08F 220/14* (2006.01)
(Continued)

(52) U.S. Cl.
CPC ............ *C08F 293/005* (2013.01); *C08F 2/06* (2013.01); *C08F 2/38* (2013.01); *C08F 4/08* (2013.01);
(Continued)

(58) Field of Classification Search
CPC .... C08F 2438/00; C08F 2438/01; C08F 2/38; C08F 2/40; C08F 293/005; C08F 4/00; C08F 4/08
See application file for complete search history.

(56) References Cited

U.S. PATENT DOCUMENTS 5,589,484 A * 12/1996 Venet .................... C07D 231/12
514/314
5,945,491 A 8/1999 Matyjaszewski et al.
(Continued)

FOREIGN PATENT DOCUMENTS

EP 3590982 1/2020
JP 08-179111 7/1996
(Continued)

OTHER PUBLICATIONS

Moad et al., Living free radical polymerization with reversible addition-fragmentation chain transfer (the life of RAFT), Polym. Int. 49, 993-1001 (2000).*
(Continued)

*Primary Examiner* — Kregg T Brooks
(74) *Attorney, Agent, or Firm* — Hamre, Schumann, Mueller & Larson, P.C.

(57) ABSTRACT

The present invention provides: a novel production technique that enables production of a polymer whose molecular weight and molecular weight distribution are controlled and production of a polymer having a complicated structure in a desirably controlled manner using commercially available
(Continued)

materials without using a radical polymerization initiator or a special material for use in living radical polymerization and without the need for strict polymerization conditions; and a radical polymerization initiating group-containing compound for use in the technique. The present invention relates to: a method for producing a polymer, the method including a polymerization step of mixing and warming (1) a radically polymerizable monomer, (2) an organic compound wherein at least one group that functions as a group for initiating polymerization of the monomer and that has a structure represented by formula 1 or formula 2 (X in the formula represents Cl or Br) is introduced in a molecule of the organic compound, and (3) an iodine-containing compound, thereby initiating, from the group having the structure, radical polymerization accompanied by a termination reaction; and the organic compound of (2) for use in the method.

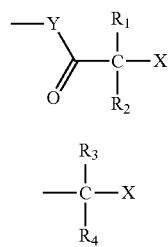

[Formula 1]

[Formula 2]

12 Claims, 2 Drawing Sheets

(51) Int. Cl.
| | |
|---|---|
| C08F 8/14 | (2006.01) |
| C08F 265/06 | (2006.01) |
| C08F 8/18 | (2006.01) |
| C08F 4/08 | (2006.01) |
| C08F 2/06 | (2006.01) |
| C08F 2/38 | (2006.01) |
| C08F 220/18 | (2006.01) |
| C08F 257/02 | (2006.01) |
| C08F 263/04 | (2006.01) |
| C08K 3/16 | (2006.01) |
| C08K 5/101 | (2006.01) |
| C08K 5/20 | (2006.01) |
| C08K 5/3417 | (2006.01) |
| C08L 101/00 | (2006.01) |

(52) U.S. Cl.
CPC .................. *C08F 8/14* (2013.01); *C08F 8/18* (2013.01); *C08F 220/14* (2013.01); *C08F 220/18* (2013.01); *C08F 257/02* (2013.01); *C08F 263/04* (2013.01); *C08F 265/06* (2013.01); *C08K 3/16* (2013.01); *C08K 5/101* (2013.01); *C08K 5/20* (2013.01); *C08K 5/3417* (2013.01); *C08L 101/005* (2013.01); *C08F 220/1803* (2020.02); *C08F 220/1804* (2020.02); *C08F 2438/00* (2013.01)

(56) References Cited

U.S. PATENT DOCUMENTS

| | | | |
|---|---|---|---|
| 6,306,995 | B1 | 10/2001 | Wang |
| 9,018,325 | B2 | 4/2015 | Goto et al. |
| 2002/0173611 | A1 | 11/2002 | Percec et al. |
| 2003/0078353 | A1* | 4/2003 | Percec ..................... C08F 2/38 526/264 |
| 2004/0014910 | A1 | 1/2004 | Wang |
| 2007/0004821 | A1* | 1/2007 | Bublewitz ............... A61K 6/10 523/109 |
| 2008/0045686 | A1* | 2/2008 | Meagher .................. C08J 7/123 526/329.7 |
| 2008/0139759 | A1 | 6/2008 | Hamada et al. |
| 2010/0036055 | A1* | 2/2010 | Hayashi .................... C08F 2/20 525/70 |
| 2011/0112242 | A1 | 12/2011 | Shimanaka et al. |
| 2014/0303334 | A1 | 10/2014 | Goto et al. |
| 2016/0347872 | A1 | 12/2016 | Goto |
| 2017/0306073 | A1* | 10/2017 | Goto ....................... C07C 69/73 |

FOREIGN PATENT DOCUMENTS

| | | |
|---|---|---|
| JP | 2000-500516 | 1/2000 |
| JP | 2000-514479 | 10/2000 |
| JP | 2000-515181 | 11/2000 |
| JP | 2003-227921 | 8/2003 |
| JP | 2005-213443 | 8/2005 |
| JP | 2007-277533 | 10/2007 |
| JP | 2009-298989 | 12/2009 |
| JP | 2011-246511 | 12/2011 |
| JP | 2013-072069 | 4/2013 |
| JP | 2015-199834 | 11/2015 |
| JP | 2015-227407 | 12/2015 |
| JP | 2016-053097 | 4/2016 |
| KR | 10-2014-0054325 | 5/2014 |
| WO | 1997/018247 | 5/1997 |
| WO | 1998/01478 | 1/1998 |
| WO | 1999/005099 | 2/1999 |
| WO | 2013/027419 | 2/2013 |
| WO | 2015/122404 | 8/2015 |

OTHER PUBLICATIONS

Japanese Office Action issued in the corresponding Japanese Patent application No. 2016-202901, dated Sep. 12, 2017, 6 pages (including machine translation).
Canadian Office Action, issued in the corresponding Canadian Patent application No. 3,011,899, dated Jul. 29, 2019, 4 pages, WO 2015/122404 cited in the action and its corresponding US 2016/0347872 having been filed Jun. 28, 2018.
Extended European Search Report, issued in the corresponding European Patent application No. 17759753.1, dated Sep. 23, 2019, 10 pages, the references that are not cited in this IDS having been provided previously in the IDS.
Wan Zheng, "Development of well-defined inorganic and polymer nanostructures for bio-nanoengeneering", Thesis submitted to the Faculty and the Board of Trustees of the Colorado School of Mines, Dec. 31, 2015, 188 pages.
Ohno et al., "A Versatile Method of Initiator Fixation for Surface-Initialed Living Radical Polymerization of Polymeric Substrates", Macromolecules, 2010, vol. 43, No. 13, Jul. 13, 2010, pp. 5569-5574.
Korean Office Action, issued in the corresponding Korean Patent application No. 10-2018-7027550, dated May 17, 2019, 14 pages (including machine translation).
International Search Report, issued in the corresponding PCT application No. PCT/JP2017/006459, dated May 23, 2017, 5 pages.
First Chinese Office Action, issued in the corresponding Chinese patent application No. 20178014058.3, dated Jul. 6, 2020, 15 pages including machine translation.
Taiwan Office Action, issued in the corresponding Taiwan patent application No. 10920193700, dated Mar. 2, 2020, 4 pages.
International Search Report, issued in the corresponding PCT application No. PCT/JP2018/012042, dated Jun. 19, 2018, 5 pages.
Chinese Office Action, issued in the corresponding Chinese patent application No. 201880019756.7, dated Jan. 13, 2020, 13 pages including machine translation.

(56) References Cited

OTHER PUBLICATIONS

Second Canadian Office Action, issued in the corresponding Canadian Patent application No. 3,011,899, dated Mar. 16, 2020, 4 pages (US references 2004/0014940 and 2011/0112242 were previously cited in the IDS, filed Jun. 26, 2018 and Oct. 7, 2019 and considered, and US reference 2003/0078353 was cited by the Examiner in a non-final Office Action dated Jan. 17, 2020).
Extended European Search Report, issued in the corresponding European patent application No. 18771677.4, dated Dec. 14, 2020, 7 pages.
Office Action issued for Australian Patent Application No. 2018239715, dated Nov. 17, 2020, 3 pages.
Office Action issued for Taiwanese Patent Application No. 107110303, dated Nov. 20, 2020, 3 pages.

* cited by examiner

[Figure 1]
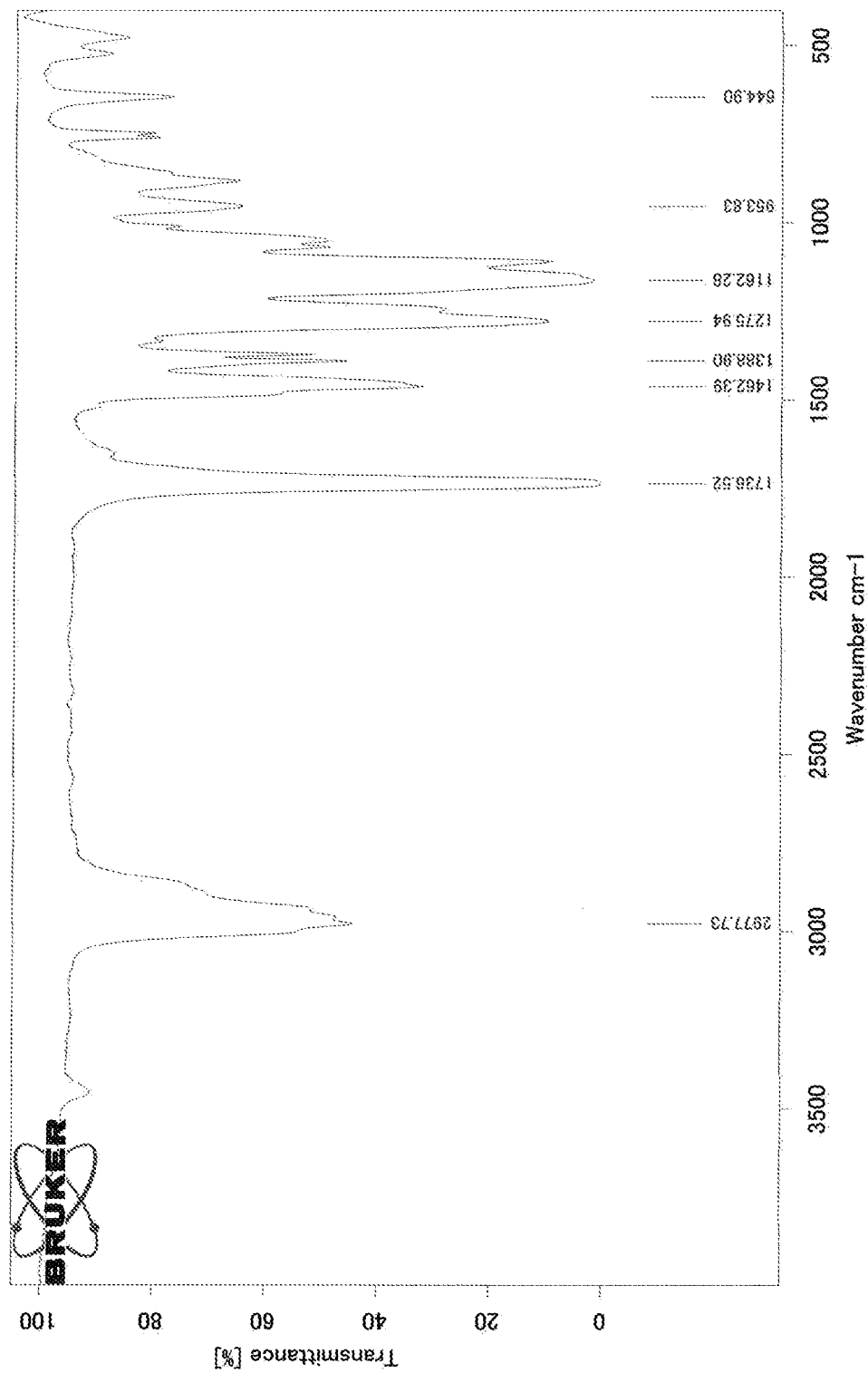

[Figure 2]
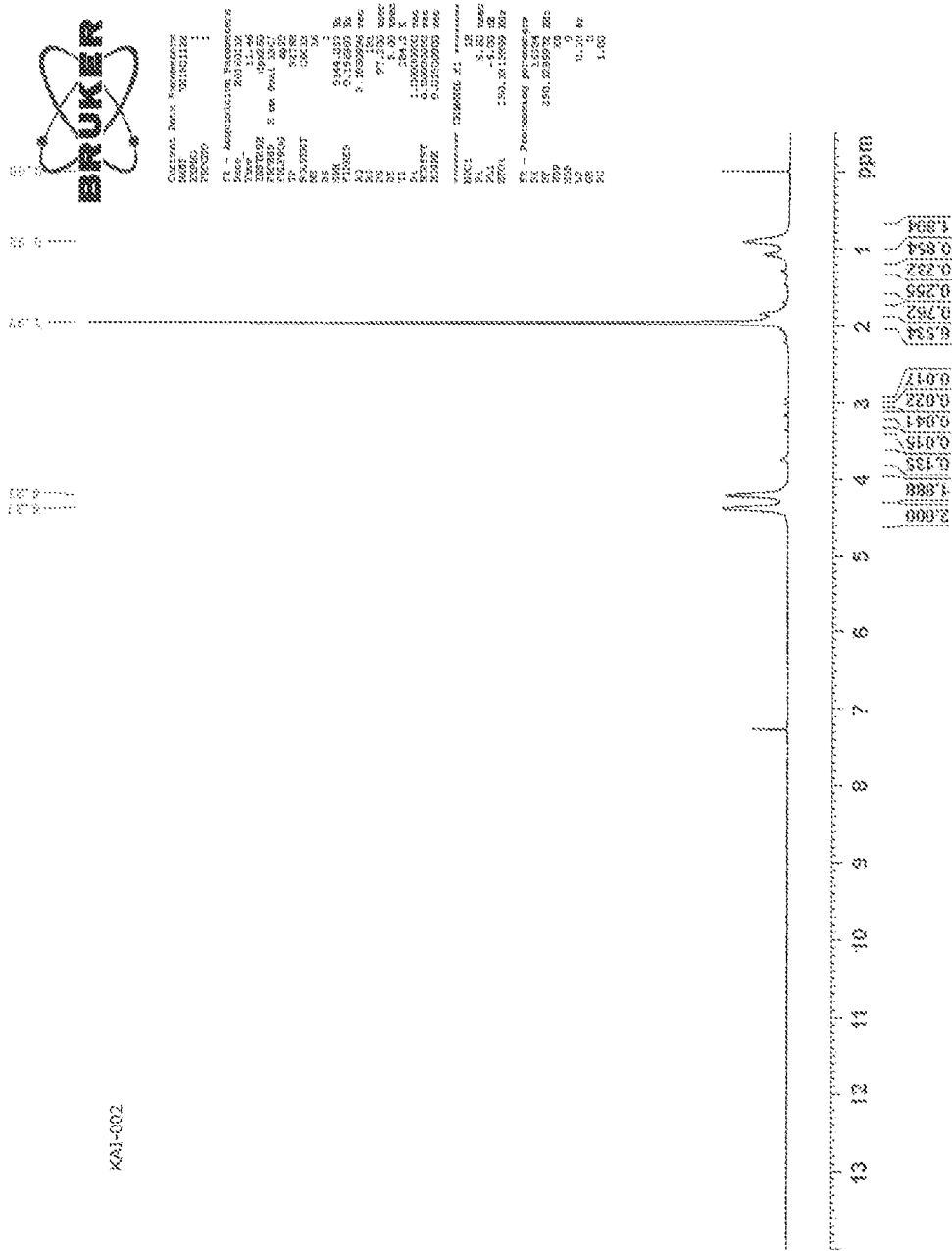

POLYMER PRODUCTION METHOD AND RADICAL POLYMERIZATION INITIATING GROUP-CONTAINING COMPOUND

TECHNICAL FIELD

The present invention relates to: a novel method for producing a polymer, the method using a radically polymerizable monomer having an unsaturated bond; a method for producing a polymer, the method enabling production of a polymer having a complicated structure as desired; and a radical polymerization initiating group-containing compound enabling realization of the production method. More specifically, the present invention relates to an industrially useful polymerization method which is advantageous in terms of cost, by which a polymer can be obtained without using a radical polymerization initiator, and by which even a polymer having a complicated structure can easily be obtained. Besides, the present invention relates to a technique that enables providing a polymer which it has been difficult to produce by conventional radical polymerization, the molecular weight of which is uniform, and the structure of which is controlled in a desired state.

BACKGROUND ART

Polymers obtained by polymerizing a radically polymerizable monomer (hereinafter, sometimes simply referred to as "monomer") having an unsaturated bond such as a vinyl group, a vinylidene group, or a vinylene group can be produced by radical polymerization or ionic polymerization and are highly versatile, and therefore such polymers have been used in a wide variety of fields up to now. For example, with respect to the radical polymerization, polymers are obtained by thermal polymerization using an azo-based radical polymerization initiator or a peroxide-based polymerization initiator that is necessary for generating a radical or by photo-radical polymerization using a photo-radical polymerization initiator.

On the other hand, in these types of radical polymerization, there are problems that the lifetime of a radical is very short, and that polymerization is terminated by a coupling reaction between radicals or a disproportionation reaction in which a radical disappears by withdrawing hydrogen from other materials. Due to the termination of the reaction, the molecular weight does not become uniform, and therefore a polymer the structure of which is controlled, such as, for example, a block copolymer, has not been able to be obtained. Against this problem, it is living radical polymerization that was invented for controlling the molecular weight and the structure of a polymer, and various methods exist as the living radical polymerization and have been studied (Patent Literatures 1 to 7). As a result, it has become possible to obtain polymers the molecular weight and structure of which are controlled in a desired state, and the living radical polymerization is industrially used.

CITATION LIST

Patent Literature

Patent Literature 1: Japanese Patent Laid-Open No. 8-179111
Patent Literature 2: Japanese Patent Laid-Open No. 2003-227921
Patent Literature 3: National Publication of International Patent Application No. 2000-500516
Patent Literature 4: National Publication of International Patent Application No. 2000-514479
Patent Literature 5: National Publication of International Patent Application No. 2000-515181
Patent Literature 6: International Publication No. WO199905099
Patent Literature 7: Japanese Patent Laid-Open No. 2007-277533

SUMMARY OF INVENTION

Technical Problem

As described above, although the radical polymerization using a radical polymerization initiator is useful, polymers having a complicated structure, such as, for example, a block copolymer, a graft copolymer, and a star polymer, cannot be obtained by a method in which a monomer is subjected to usual radical polymerization. On the other hand, according to the living radical polymerization, although the above-described polymers having a complicated structure can be obtained, there are problems described below in obtaining such polymers. That is, special compounds or a metal catalyst is used in the living radical polymerization, and therefore it is necessary to remove the compounds or the metal catalyst, so that a plurality of complicated steps are industrially necessary, and in addition, it has been necessary to control the polymerization conditions strictly because purification of monomers to be used is necessary, the living radical polymerization needs to be performed under a nitrogen atmosphere, etc.

Accordingly, an object of the present invention is to provide an industrially useful, novel method for producing a polymer, by which a polymer the molecular weight and molecular weight distribution of which are controlled and a polymer having a complicated structure, such as a block copolymer, a graft copolymer, or a star polymer, can be obtained as a polymer the structure of which is desirably controlled simply using simple commercially available materials without using a radical polymerization initiator, and a special material and a metal catalyst for use in the living radical polymerization by a simple method without the need for strict polymerization conditions. Moreover, another object of the present invention is to provide a versatile radical polymerization initiating group-containing compound that enables realization of the above-described epoch-making method for producing a polymer. Furthermore, yet another object of the present invention is to enable providing a useful polymer the structure of which is controlled in a desired state in an industrially stably manner by finding out such a method for producing a polymer.

Solution to Problem

The present inventors have conducted diligent studies for the purpose of solving the above-described problems to complete the present invention by finding out a novel polymerization method in which: a monomer, an organic compound wherein a group that functions as a polymerization initiating group and that has a particular structure specified in the present invention is introduced, and an iodine ion-containing compound are used; and when these are only mixed and warmed (heated), radical polymerization accompanied by a termination reaction is initiated from the above-described group having a particular structure and the radical polymerization progresses, so that a polymer can be obtained. Further, the present inventors have found out a novel polymerization method by which the structure and molecular weight of a polymer to be obtained can be controlled in a desired state in an extremely simple manner by using iodine, a compound that is capable of releasing iodine, or an organic base together with the monomer, the organic compound, and the iodine ion-containing compound. According to the novel polymerization method that is found out by the present inventors, a polymer can be obtained simply by only mixing and warming necessary materials without using a radical polymerization initiator that has been used in conventional polymerization methods and without using a special material and a metal-based catalyst for use in the living radical polymerization, and further, a polymer the form and characteristics of which are controlled in a desired state can be obtained. It is to be noted that the term "warming" as specified in the present invention means that the temperature is raised to room temperature or higher, and, for example, the temperature may be 40° C. or higher, and may be determined by striking the balance between the temperature and the polymerization speed.

That is, the present invention provides a method for producing a polymer, the method comprising a polymerization step of mixing and warming at least: (1) a radically polymerizable monomer having an unsaturated bond; (2) an organic compound wherein at least one group that functions as a group for initiating polymerization of the monomer and that has a structure represented by the following formula 1 or the following formula 2 is introduced in a molecule of the organic compound; and (3) an iodine ion-containing compound being at least one iodide salt or triiodide salt selected from the group consisting of metal iodides, quaternary ammonium iodides, quaternary phosphonium iodides, and quaternary ammonium triiodides, thereby initiating, from the group having the structure, radical polymerization accompanied by a termination reaction.

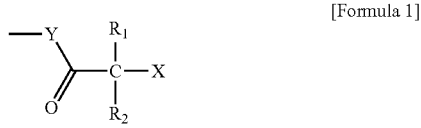

[Formula 1]

wherein, $R_1$ represents H or an arbitrary alkyl or acyl group, $R_2$ represents an arbitrary alkyl or aryl group, X represents Cl or Br, and Y represents O or NH.

[Formula 2]

wherein $R_3$ represents H or an arbitrary alkyl or aryl group, $R_4$ represents an aryl group, a cyano group, a carboxyl group, an ester group, or an amide group, and X represents Cl or Br.

Preferred embodiments of the above-described method for producing a polymer include the followings. That is, the preferred embodiments include that: any of azo-based radical polymerization initiators, peroxide-based radical polymerization initiators, and photo-radical polymerization initiators is not used in the polymerization step; at least any one selected from the group consisting of (4) iodine; iodinated organic compounds that are capable of releasing iodine; and compounds each having an organic base is further used in the polymerization step; an organic solvent is further used during the polymerization step; the organic solvent is at least any one selected from the group consisting of alcohol-based solvents, glycol-based solvents, amide-based solvents, sulfoxide-based solvents, and ionic liquids; the iodinated organic compound that is capable of releasing iodine is an N-iodoimide-based compound; the N-iodoimide compound is at least any one selected from the group consisting of N-iodosuccinimide, N-iodophthalimide, N-iodocyclohexanylimide, 1,3-diiodo-5,5-dimethylhydantoin, and N-iodosaccharin; and the group having a structure represented by the formula 1 is a group having a structure represented by the following formula 3.

[Formula 3]

wherein, Y represents O or NH.

The preferred embodiments of the above-described method for producing a polymer also include the followings. Even though the method is simple, desired polymers having various kinds of constitution, such as, for example, an ABA block copolymer, a star polymer, a bottle brush polymer, a dense polymer brush, and a heterogeneous graft/block/multi-branched polymer can be obtained by only changing the constitution of the organic compound of (2) to any one of the followings.

That is, in the above-described method for producing a polymer, when the organic compound of (2) is a polymerization initiating group-containing polymer wherein two groups each having a structure represented by the formula 1 or the formula 2 are introduced in a molecule of the polymerization initiating group-containing polymer, the polymer to be obtained in the polymerization step is a polymer having a block structure or a comb-shaped structure. Moreover, when the organic compound of (2) is a compound wherein three or more groups each having a structure represented by the formula 1 or the formula 2 are introduced in a molecule of the compound, the polymer to be obtained in the polymerization step is a branched structure type polymer, a star polymer, or a graft copolymer. Moreover, when the organic compound of (2) is a vinyl polymer wherein three or more groups each having a structure represented by the formula 1 or the formula 2 are introduced in a molecule of the vinyl polymer, the polymer to be obtained in the polymerization step is a polymer having a structure wherein the monomer of (1) is grafted through polymerization onto the vinyl polymer or is a bottle brush polymer. Moreover, when the organic compound of (2) is a copolymer of a monomer wherein at least one group having a structure represented by the formula 1 or the formula 2 is introduced in a molecule of the monomer and a monomer having a reactive group that bonds to a surface of a base material; and the base material is treated with the copolymer to modify the surface of the base material, and thereafter the monomer of (1) and the iodine ion-containing compound of (3) are mixed and warmed on the modified surface of the base material, a polymer having a dense brush structure is produced on the surface of the base material.

The present invention provides as another embodiment a radical polymerization initiating group-containing compound for conducting radical polymerization of a radically polymerizable monomer having an unsaturated bond, the radical polymerization accompanied by a termination reaction, without using any of azo-based radical polymerization initiators, peroxide-based radical polymerization initiators, and photo-radical polymerization initiators, wherein at least one group having a structure represented by the following formula 1 or the formula 2 is introduced in a molecule of the radical polymerization initiating group-containing compound, the group functioning as a group for initiating polymerization of the radically polymerizable monomer by using the radical polymerization initiating group-containing compound with an iodine ion-containing compound being at least one iodide salt or triiodide salt selected from the group consisting of metal iodides, quaternary ammonium iodides, quaternary phosphonium iodides and quaternary ammonium triiodides.

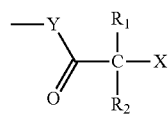

[Formula 1]

wherein $R_1$ represents H or an arbitrary alkyl or acyl group, $R_2$ represents an arbitrary alkyl or aryl group, X represents Cl or Br, and Y represents O or NH.

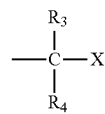

[Formula 2]

wherein $R_3$ represents H or an arbitrary alkyl or aryl group, $R_4$ represents an aryl group, a cyano group, a carboxyl group, an ester group, or an amide group, and X represents Cl or Br.

Preferred embodiments of the radical polymerization initiating group-containing compound include the followings. That is, the preferred embodiments include that: in the radical polymerization initiating group-containing compound, the group having a structure represented by the formula 1 is a group having a structure represented by the following formula 3,

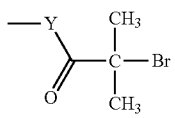

[Formula 3]

wherein Y represents O or NH;

the radical polymerization initiating group-containing compound is a polymer wherein two groups each having a structure represented by the formula 1 or the formula 2 are introduced in a molecule of the polymer;

the radical polymerization initiating group-containing compound is a compound wherein three or more groups each having a structure represented by the formula 1 or the formula 2 are introduced in a molecule of the compound;

the radical polymerization initiating group-containing compound is a vinyl polymer wherein three or more groups each having a structure represented by the formula 1 or the formula 2 are introduced in a molecule of the vinyl polymer; and the radical polymerization initiating group-containing compound is a copolymer of a monomer wherein at least one group having a structure represented by the formula 1 or the formula 2 is introduced in a molecule of the monomer and a monomer having a reactive group that bonds to the surface of the base material.

Advantageous Effects of Invention

According to the present invention, there is provided an extremely simple method for producing a polymer, wherein radical polymerization accompanied by a termination reaction is initiated from the group having the above-described structure by only mixing and warming (heating) at least: an organic compound which is for general purposes and which can be made into various forms, the organic compound having a group that functions as a group for initiating polymerization of a monomer and that has a particular structure; a monomer; and an iodine ion-containing compound, and thereby a polymer can be obtained. Moreover, according to the present invention, there is provided a method for producing a polymer, which has never been achieved by conventional radical polymerization accompanied by a termination reaction, by which a polymer the molecular weight and structure of which are controlled as desired can easily be obtained by only adding a compound that releases iodine further to the above-described system. According to the present invention, by utilizing the above-described excellent production method, polymers having a complicated structure, the industrial production of which has been difficult and complicated, such as, for example, an ABA block copolymer, a star polymer, a bottle brush polymer, a dense polymer brush, and a heterogeneous/block/multi-branched polymer, can easily be obtained.

The production method according to the present invention is useful in terms of the environment and is advantageous in terms of costs because the types of materials to be used for production are reduced when compared to conventional methods. Further, the method for producing a polymer according to the present invention is highly safety because there is no need to use an explosive compound, such as an azo-based polymerization initiator or a peroxide-based polymerization initiator which has conventionally been used. In addition, in the method for producing a polymer according to the present invention, there is no need to keep materials in refrigeration/cold storage as has been the case with the conventional azo-based and peroxide-based polymerization initiators. Moreover, compounds containing a chlorine atom or a bromine atom bonded to a polymerization initiating group are used in the production method according to the present invention and the bond is relatively stable, so that there is no need to use an iodine atom-containing, polymerization-initiating compound that is used in the living radical polymerization and that decomposes by heat or light even though the compound is highly useful, and therefore the production method according to the present invention has a major merit in the storage of materials. It means that these points have extremely high practical values in the method for producing a polymer.

The method for producing a polymer according to the present invention by which the above-described various excellent effects are obtained can be realized for the first time by the radical polymerization initiating group-containing compound according to the present invention. The radical polymerization initiating group-containing compound may be a compound wherein at least one group having a simple structure specified in the present invention is introduced, and is a general-purpose compound having no limitations other than the group. Specifically, the number of groups to be introduced, and the form of the organic compound wherein the group is introduced can appropriately be changed into a general-purpose low-molecular-weight compound, a polymer, or a monomer for use. Therefore, by using the radical polymerization initiating group-containing compound according to the present invention, obtaining easily and economically various polymers which are designed to have a desired structure, such as an ABA block copolymer, a star polymer, a bottle brush polymer, a dense polymer brush, a heterogeneous graft/block/multi-branched polymer, can be realized.

BRIEF DESCRIPTION OF DRAWINGS

FIG. 1 is a graph showing an IR chart of an initiating group polymer-1.
FIG. 2 is a graph showing an NMR chart of an initiating group polymer-1.

DESCRIPTION OF EMBODIMENTS

Hereinafter, the present invention will be described in more detail giving preferred embodiments.

The present inventors have conducted diligent studies for the purpose of achieving the objects of the present invention, and as a result, the present inventors have completed the present invention by finding out a polymerization method: by which a polymer having a complicated structure can easily be obtained using simple, commercially available materials without using a conventional material having a problem in safety and storability; which is extremely industrially useful; and which has totally novel constitution that has never been existed up to now. In the production method according to the present invention, a radically polymerizable monomer, an organic compound wherein a group that is specified in the present invention, that functions as a polymerization initiating group, and that has a particular structure is introduced, and an iodine ion-containing compound are used, and when these are only mixed and warmed (heated), radical polymerization accompanied by a termination reaction is easily initiated from the group having a particular structure, and the radical polymerization progresses, so that a polymer can be obtained. The production method according to the present invention will be described below specifically. The production method according to the present invention is constituted as follows.

The method for producing a polymer according to the present invention comprises a particular polymerization step of mixing and warming at least: (1) a radically polymerizable monomer; (2) an organic compound wherein at least one group that functions as a group for initiating polymerization of the monomer and that has a structure represented by the following formula 1 or the following formula 2 is introduced in a molecule of the organic compound; and (3) an iodine ion-containing compound being at least one iodide salt or triiodide salt selected from the group consisting of metal iodides, quaternary ammonium iodides, quaternary phosphonium iodides, and quaternary ammonium triiodides; thereby initiating, from the group having the above-described structure, radical polymerization accompanied by a termination reaction. Hereinafter, each material that constitutes the present invention will be described in detail.

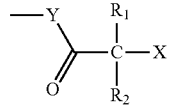

[Formula 1]

wherein, $R_1$ represents H or an arbitrary alkyl or acyl group, $R_2$ represents an arbitrary alkyl or aryl group, X represents Cl or Br, and Y represents O or NH.

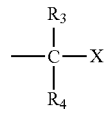

[Formula 2]

wherein $R_3$ represents H or an arbitrary alkyl or aryl group, $R_4$ represents an aryl group, a cyano group, a carboxyl group, an ester group, or an amide group, and X represents Cl or Br.

[(1) Radically Polymerizable Monomer Having Unsaturated Bond]

In the method for producing a polymer according to the present invention, (1) a radically polymerizable monomer having an unsaturated bond, the monomer being a component for forming the polymer, is used as an essential component. Examples of the monomer having an unsaturated bond include conventionally known monomers having an unsaturated bond, such as monomers each having a vinyl group, a vinylidene group, or a vinylene group. That is, any of the conventionally known, radically polymerizable monomers as described below can be used, and the radically polymerizable monomer is not particularly limited.

Examples of the radically polymerizable monomer having an unsaturated bond include monomers such as styrene, vinyltoluene, vinyl hydroxybenzene, chloromethylstyrene, vinylnaphthalene, vinylphenyl, vinyl ethylbenzene, vinyl dimethylbenzene, α-methylstyrene, ethylene, propylene, isoprene, butene, butadiene, 1-hexene, cyclohexene, cyclodecene, dichloroethylene, chloroethylene, fluoroethylene, tetrafluoroethylene, acrylonitrile, methacrylonitrile, vinyl acetate, vinyl propionate, isocyanato-dimethyl methane isopropenylbenzene, phenylmaleimide, cyclohexylmaleimide, hydroxymethylstyrene, styrenesulfonic acid, vinylsulfonic acid, vinylamine, allylamine, aminostyrene, vinylmethylamine, allylmethylamine, methylaminostyrene, vinylpyridine, vinyl imidazole, vinylbenzotriazole, vinylcarbazole, dimethylaminostyrene, diallylmethylamine, trimethylammonium styrene chloride, dimethyl lauryl aminostyrene chloride, vinyl methyl pyridinyl chloride, and diallyldimethylammonium chloride.

In addition, examples of the radically polymerizable monomer include (meth)acrylate-based monomers and (meth)acrylamide-based monomers as described below. Specifically, examples thereof include aliphatic (meth)acrylates, alicyclic (meth)acrylates, and aromatic (meth)acrylates such as methyl (meth)acrylate, ethyl (meth)acrylate, propyl (meth)acrylate, isopropyl (meth)acrylate, butyl (meth)acrylate, 2-methylpropane (meth)acrylate, t-butyl (meth)acrylate, pentyl (meth)acrylate, hexyl (meth)acrylate, octyl (meth)acrylate, 2-ethylhexyl (meth)acrylate, nonyl (meth)acrylate, decyl (meth)acrylate, isodecyl (meth)acrylate, lauryl (meth)acrylate, tetradecyl (meth)acrylate, octadecyl (meth)acrylate, behenyl (meth)acrylate, isostearyl (meth)acrylate, cyclohexyl (meth)acrylate, t-butylcyclohexyl (meth)acrylate, isobornyl (meth)acrylate, trimethylcyclohexyl (meth)acrylate, cyclodecyl (meth)acrylate, cyclodecylmethyl (meth)acrylate, benzyl (meth)acrylate, t-butylbenzotriazolephenylethyl (meth)acrylate, phenyl (meth)acrylate, naphthyl (meth)acrylate, and allyl (meth)acrylate.

Examples of the radically polymerizable monomer also include alkylene glycol mono(meth)acrylates such as 2-hydroxyethyl (meth)acrylate, 2-hydroxypropyl (meth)acrylate, 3-hydroxypropyl (meth)acrylate, 4-hydroxybutyl (meth)acrylate, 6-hydroxyhexyl (meth)acrylate, cyclohexane dimethanol mono(meth)acrylate, and cyclohexanediol mono (meth)acrylate, which are hydroxy group-containing monomers.

Examples of the radically polymerizable monomer also include polyalkylene glycol mono(meth)acrylates such as poly (n=2 or more, the same applies hereinafter) ethylene glycol mono(meth)acrylate, polypropylene glycol mono (meth)acrylate, polytetramethylene glycol mono(meth)acrylate, mono(meth)acrylates of mono- or poly-ethylene glycol/ mono- or poly-propylene glycol random copolymers, and mono(meth)acrylates of mono- or poly-ethylene glycol/ mono- or poly-propylene glycol block copolymers, which are monomers having a glycol group.

Further, examples of the radically polymerizable monomer include (polyalkylene)glycol monoalkyl, alkylene, or alkyne ether or ester mono(meth)acrylates such as (poly) ethylene glycol monomethyl ether (meth)acrylate, (poly) ethylene glycol monooctyl ether (meth)acrylate, (poly)ethylene glycol monolauryl ether (meth)acrylate, (poly) ethylene glycol monostearyl ether (meth)acrylate, (poly) ethylene glycol monooleyl ether (meth)acrylate, (poly) ethylene glycol monostearic acid ester (meth)acrylate, (poly)ethylene glycol mononomylphenyl ether (meth)acrylate, (poly)propylene glycol monomethyl ether (meth)acrylate, (poly)propylene glycol monoethyl ether (meth)acrylate, (poly)propylene glycol monooctyl ether (meth)acrylate, (poly)propylene glycol monolauryl ether (meth)acrylate, and (poly)ethylene glycol (poly) propylene glycol monomethyl ether (meth)acrylate.

The monomers as described below, which are monomers having an acid group (carboxyl group, sulfonic acid group, phosphoric acid group), can also be used. Examples of the monomers having a carboxyl group include: acrylic acid; methacrylic acid; maleic acid; acrylic acid dimer; itaconic acid; fumaric acid; crotonic acid; a monomer obtained by reacting a hydroxyalkyl (meth)acrylate such as 2-hydroxyethyl (meth)acrylate or 4-hydroxybutyl (meth)acrylate with maleic anhydride, succinic anhydride, phthalic anhydride, or the like; and maleic acid or itaconic acid monoester-based monomers. In addition, examples of the monomers having a sulfonic acid group include dimethylpropyl sulfonic acid (meth)acrylamide, ethyl sulfonate (meth)acrylate, and ethyl sulfonate (meth)acrylamide. Examples of the monomers having a phosphoric acid group include (di, tri)methacryloyloxyethyl phosphate.

Examples of the radically polymerizable monomer also include glycidyl (meth)acrylate, tetrahydrofurfuryl (meth) acrylate, oxetanylmethyl (meth)acrylate, morpholino (meth) acrylate, methylmorpholino (meth)acrylate, and methylmorpholinoethyl (meth)acrylate, which are oxygen atom-containing monomers.

Examples of the radically polymerizable monomer also include the following monomers, which are monomers having an amino group. Examples of the monomers having a primary amino group include 2-aminoethyl (meth)acrylate and 2-aminopropyl (meth)acrylamide, and examples of the monomers having a secondary amino group include t-butylaminoethyl (meth)acrylate, tetramethylpiperidyl (meth) acrylate, and t-butylaminopropyl (meth)acrylamide. Examples of the monomers having a tertiary amino group include dimethylaminoethyl (meth)acrylate, diethylaminoethyl (meth)acrylate, pentamethylpiperidyl (meth)acrylate, N-ethylmorpholino (meth)acrylate, and dimethylpropyl (meth)acrylamide. Examples of the monomers having a quaternary amino group include trimethylaminoethyl (meth) acrylate chloride, diethylmethylaminoethyl (meth)acrylate chloride, dimethylaminoethyl (meth)acrylate benzyl chloride, and trimethylaminoethyl (meth)acrylate methylsulfuric acid salt. In addition, examples of the monomers having an amino group include a monomer obtained by reacting a glycidyl group-containing monomer such as glycidyl (meth) acrylate with a primary or secondary amine.

Examples of the radically polymerizable monomer having an unsaturated bond also include: (meth)acryloyloxyethyl isocyanate, (meth)acryloyloxyethoxyethyl isocyanate, and a blocked isocyanate-containing (meth)acrylate wherein isocyanate in (meth)acryloyloxyethyl isocyanate or (meth) acryloyloxyethoxyethyl isocyanate is blocked by caprolactone or the like; ethylene iminoethyl (meth)acrylate; amide-based monomers such as (meth)acrylamide, N,N-dimethyl (meth)acrylamide, N,N-diethyl (meth)acrylamide, N-methylol (meth)acrylamide, and N-butoxymethyl (meth)acrylamide; N-vinylpyrrolidone; N-vinylacetamide; and N-vinylcaprolactam, which are nitrogen atom-containing monomers.

Furthermore, as an additional monomer, the monomers described below can also be used. Such monomers include: a polyester-based mono(meth)acrylic acid ester obtained by subjecting a lactone such as ε-caprolactone or γ-butyrolactone to ring-opening polymerization using the above-described (poly)alkylene glycol mono(meth)acrylic acid ester such as (meth)acryloyloxyethyl mono- or poly-caprolactone as an initiator; an ester-based (meth)acrylate obtained by reacting the above-described (poly)alkylene glycol mono (meth)acrylic acid ester such as 2-(meth)acryloyloxyethyl-2-hydroxyethyl phthalate or 2-(meth)acryloyloxyethyl-2-hydroxyethyl succinate with a dibasic acid to produce a half-ester and then reacting the other carboxylic acid with an alcohol or an alkylene glycol;

mono(meth)acrylates of a multi-functional hydroxy group-containing compound having three or more hydroxy groups, such as glycerol mono(meth)acrylate and dimethylolpropane mono(meth)acrylate; halogen atom-containing (meth)acrylates such as 3-chloro-2-hydroxypropyl (meth) acrylate, octafluorooctyl (meth)acrylate, and tetrafluoroethyl (meth)acrylate; silicon-containing monomers having a trimethoxysilyl group or a dimethyl silicone chain; ultraviolet-absorbing monomers such as 2-(4-bozoxy-3-hydroxyphenoxy)ethyl (meth)acrylate and 2-(2'-hydroxy-5-(meth) acryloyloxyethylphenyl)-2H-benzotriazole; and acrylates in which hydrogen in a methyl group at an α-position is replaced by a hydroxy group, such as ethyl-α-hydroxymethyl acrylate.

Further, cyclic vinyl-based monomers can also be used, and monomers having two or more addition polymerizable groups can also be used as necessary. Examples of such monomers include: divinylbenzene; ethylene glycol di(meth)acrylate; diethylene glycol di(meth)acrylate; a (meth)

acrylic acid ester of a polyalkylene glycol adduct of trimethylolpropane; and a (meth)acrylic acid ester of an alkylene oxide adduct of bisphenol A. At least one of the above-described radically polymerizable monomers having an unsaturated bond can be used. One of the objects of the present invention is to obtain an ABA block copolymer, a star polymer, a bottle brush polymer, a dense polymer brush, a heterogeneous graft/block/multi-branched polymer, or the like simply, and therefore two or more radically polymerizable monomers are usually used. Hereinafter, each of these monomers are sometimes written as "monomer of (1)".

[(2) Organic Compound Containing at Least One Group Having Structure Represented by Formula 1 or Formula 2 in Molecule Thereof]

Hereinafter, the organic compound (radical polymerization initiating group-containing compound) of (2), which characterizes the present invention and which functions as a group for initiating polymerization of the monomer of (1), will be described. According to studies conducted by the present inventors, when the monomer of (1) and the iodine ion-containing compound of (3), which will be described later, are mixed and warmed in the presence of the group having a structure represented by the following formula 1 or 2 (hereinafter, also referred to as "group of formula 1 or 2"), radical polymerization accompanied by a termination reaction is initiated as the result of the mixing and warming from the group that characterizes the present invention and that has a particular structure as described above, so that various polymers whose structure is controlled are obtained.

The organic compound of (2) that is used in the present invention and that characterizes the present invention may be a compound wherein the structure as shown below is introduced in a molecule thereof, and this structure functions as a group for initiating polymerization of the monomer of (1). The organic compound of (2) is highly safety when compared to azo-based polymerization initiators and peroxide-based polymerization initiators which have been used up to now, and there is no need to keep the material in refrigeration/cool storage as is the case for the conventional initiators. In addition, a compound wherein a chlorine atom or a bromine atom is bonded in the structure thereof is used, and therefore the bond is relatively stable, so that the compound never decompose due to heat or light as is the case with polymerization initiating compounds which are used in the living radical polymerization and to which an iodine atom is bonded.

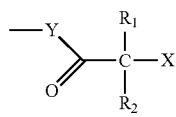

[Formula 1]

wherein $R_1$ represents H or an arbitrary alkyl or acyl group, $R_2$ represents an arbitrary alkyl or aryl group, X represents Cl or Br, and Y represents O or NH.

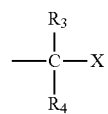

[Formula 2]

wherein $R_3$ represents H or an arbitrary alkyl or aryl group, $R_4$ represents an aryl group, a cyano group, a carboxyl group, an ester group, or an amide group, and X represents Cl or Br.

The "group of formula 1 or 2" specified in the present invention is characterized in that a chlorine atom (also referred to as "chloro") or a bromine atom (also referred to as "bromo") is bonded in the structure of the group, and these atoms can be released or replaced through reaction. Further, the "group of formula 1 or formula 2" is a group in which at least one of an ester group, an amide group, a cyano group, a carboxyl group, an aryl group, or the like, which are electron withdrawing groups, is bonded to the carbon to which the chlorine atom or the bromine atom is bonded. In the present invention, any of organic compounds can be used as long as the organic compounds are each an organic compound having a structure wherein at least one of such groups are introduced in a molecule of the organic compound. As the organic compound of (2), any form of, for example, a low-molecular-weight compound, a monomer, and a polymer can be used. Hereinafter, the "group of formula 1" and the "group of formula 2" will be described separately.

Firstly, examples of the "group of formula 1" are specifically shown, but the "group of formula 1" is not limited to the examples below. Examples of the "group of formula 1" include the groups having an ester bond or an amide bond in the structure thereof, as shown below. In the organic compound for use in the present invention, wherein at least one "group of formula 1" is introduced in a molecule of the organic compound, a chlorine atom (Cl) or a bromine atom (Br) is bonded through an ester bond or an amide bond, as shown below.

Examples of the "group of formula 1" include the groups having an ester bond or an amide bond derived from a β-chloro or β-bromo alkanoic acid, as shown below.

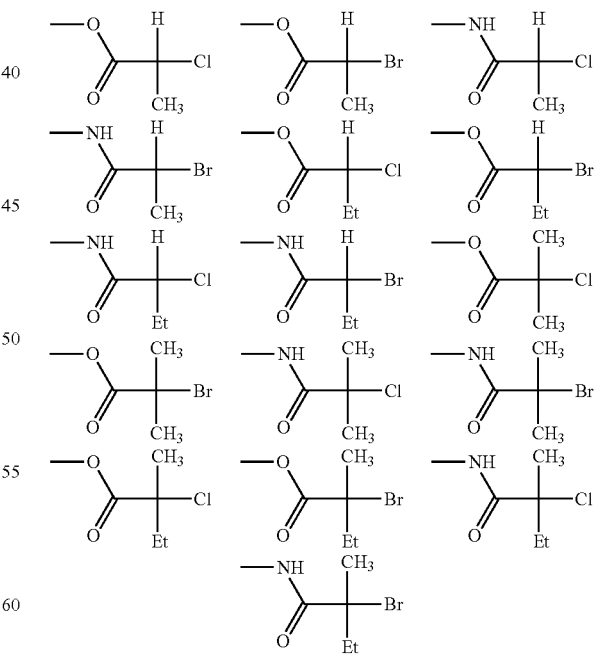

Examples of the "group of formula 1" also include the groups having an ester bond or an amide bond derived from an aryl-substituted β-chloro or β-bromo alkanoic acid, as shown below.

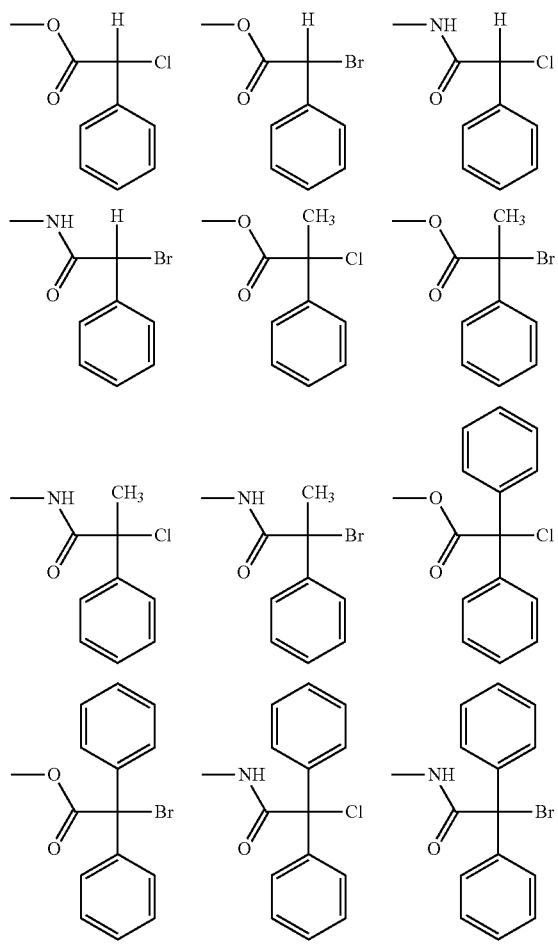

Examples of the "group of formula 1" also include the groups having an ester bond or an amide bond derived from a chloro- or bromo-substituted acetoalkanoic acid, as shown below.

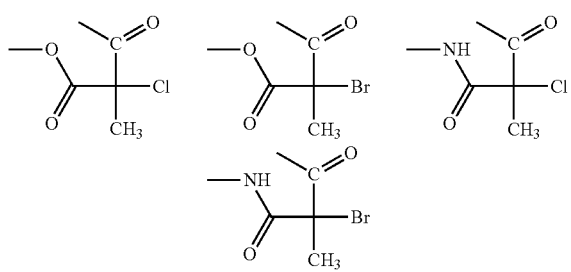

Next, examples of the "group of formula 2" are specifically shown, but the "group of formula 2" is not limited to the examples below. Examples of the "group of formula 2" include the groups shown below, and any of organic compounds wherein any of these groups are directly bonded to the organic compounds can be used as the organic compound of (2) specified in the present invention.

Examples of the "group of formula 2" include chloro- or bromo-substituted aryl-substituted alkyl groups, as shown below.

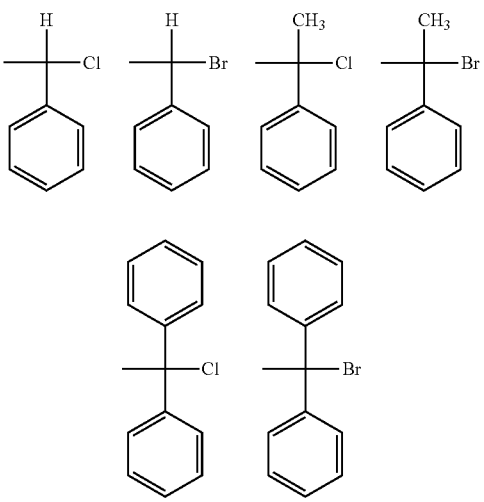

Examples of the "group of formula 2" also include chloro- or bromo-substituted cyano group-containing alkyl groups, as shown below.

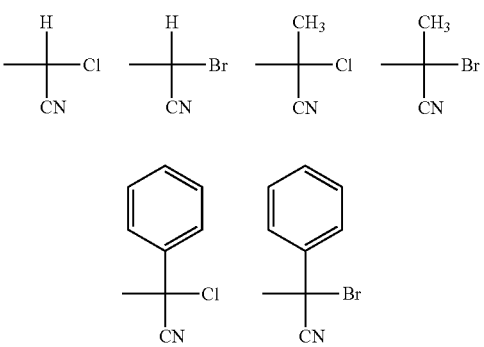

Examples of the "group of formula 2" also include chloro- or bromo-substituted alkanoic acid groups and esterified products of carboxylic acids thereof, as shown below.

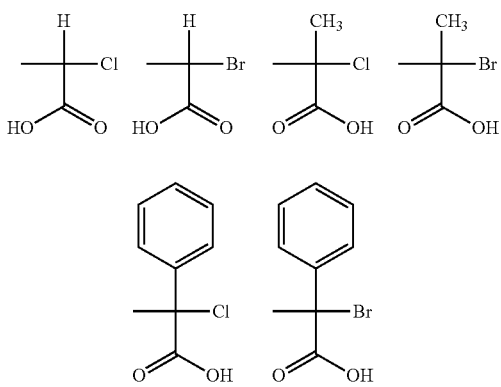

Examples of the "group of formula 2" also include amides of chloro- or bromo-substituted alkanoic acids and N-monoalkyl-substituted or N-dialkyl-substituted amides thereof, as shown below.

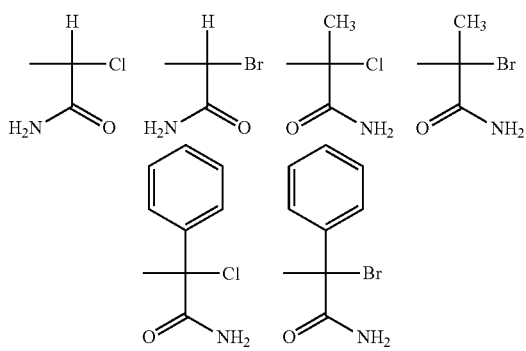

Introduction of the "group of formula 1 or 2" the examples of which are given above into the organic compound may be performed by an arbitrary method, and the method is not particularly limited. For example, when the "group of formula 1" is introduced, the target compound is obtained by esterifying the corresponding carboxylic acid-containing compound or by subjecting the corresponding carboxylic acid-containing compound to amidation. In addition, the target compound is obtained by reacting a compound having an epoxy group with a compound having the "group of formula 1". Moreover, the "group of formula 1 or 2" may be introduced in such a way that a compound in which a hydroxy group is bonded to X in the structure of the "group of formula 1 or formula 2", namely a hydroxy group is bonded to a group to which chlorine or bromine is to be bonded, is used, and the hydroxy group moiety of the compound is replaced with chlorine or bromine using concentrated hydrochloric acid or hydrobromic acid. Furthermore, chloro or bromo may be introduced in such a way that a compound having an unsaturated bond at the C—X moiety in the structure of the "group of formula 1 or 2", and hydrogen chloride or hydrogen bromide is added to the unsaturated bond. The above-described methods are given as examples, and the method for introducing the "group of formula 1 or 2" into the organic compound is not particularly limited to those methods and conventionally known compounds and organic reactions are used.

As the organic compound of (2) that characterizes the present invention, any organic compound may be used as long as the above-described "group of formula 1 or 2" is introduced therein. According to studies conducted by the present inventors, particularly, an organic compound wherein a group having a structure represented by the following formula 3 (hereinafter, referred to as "group of formula 3") among the "groups of formula 1" is introduced is preferably used because such an organic compound enhances the speed of initiated polymerization reaction and can easily be synthesized from commercially available compounds.

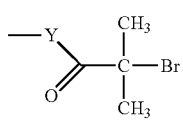

[Formula 3]

wherein Y represents O or NH.

The "group of formula 3" can be obtained from conventionally known materials and by a conventionally known method, and the organic compounds in various forms, wherein the "group of formula 3" is introduced therein, can also be obtained easily, and the method is not particularly limited. One example in which the organic compound wherein the "group of formula 3" is introduced can easily be synthesized is described below. The organic compound wherein the "group of formula 3" is introduced is obtained by using a 2-bromoisobutyric acid-based compound as a raw material and, as an organic compound into which the "group of formula 3" is to be introduced, an organic compound having a group that can react with a carboxyl group in the 2-bromoisobutyric acid-based compound and derivatives of the 2-bromoisobutyric acid-based compound, and reacting these compounds. The compounds to be used in obtaining organic compound wherein the "group of formula 3" is introduced are not particularly limited. Examples of the 2-bromoisobutyric acid-based compound include 2-bromoisobutyric acid, 2-bromoisobutyric bromide, and 2-bromoisobutyric anhydride. The "group of formula 3" can be introduced into an organic compound through an ester bond or an amide bond by reacting any of these 2-bromoisobutyric acid-based compounds with an organic compound having a reactive group, such as a hydroxy group, an amino group, an epoxy group, a carbodiimide group, an oxazoline group, an isocyanate group, or an ethylene imine group, which can react with a carboxyl group-based compound to form a pair.

The compound of (2) that characterizes the present invention is an organic compound wherein at least one "group of formula 1 or 2" described above or at least one "group of formula 3" that is more preferably used among others (these are sometimes collectively referred to as "groups of formulas 1 to 3") is introduced in a molecule of the organic compound. As described previously, as the organic compound to be used may be in any form, and conventionally known organic compounds can be used. The number of conventionally known organic compounds is too large to give examples. Hereinafter, description will be made on how the monomer of (1) can be polymerized and how the polymers of various structures can be formed by using the organic compound of (2) that characterizes the present invention without using any of azo-based radical polymerization initiators, peroxide-based radical polymerization initiators, and photo-radical polymerization initiators which have been used in polymerization up to now.

When the organic compound of (2) wherein one of the "groups of formulas 1 to 3" is introduced in a molecule of the organic compound of (2) is used; the monomer of (1) is added thereto in a state where the iodine ion-containing compound of (3) described later is used together with the monomer of (1); and the resultant mixture is warmed, polymerization is initiated from the organic compound of (2) as an initiation group, and the polymerization progresses, so that a straight chain polymer using a radically polymerizable monomer as a constituent can be obtained. In addition, in the case where the organic compound of (2) wherein two of the "groups of formulas 1 to 3" are introduced in a molecule of the organic compound of (2) is used, polymerization is initiated in such a way that two chains are extended from the organic compound, thereby forming the structure of a polymer. Therefore, in the case where the form of the organic compound of (2) to be used is a polymer component, when the "groups of formulas 1 to 3" exist at both terminals of the organic compound, an ABA block copolymer, wherein the polymer component is assumed to be B and a polymerized product of the monomer of (1) is assumed to be A, can be produced. Furthermore, in this case, when the form of the polymer of the organic compound of (2) to be used is such that two of the "groups of formulas 1 to 3" are hanging down in the molecule, a polymer to be obtained can be made to have a comb-like structure of two teeth.

Conventionally known polymers can be used as the polymer being the organic compound of (2), and the polymer being the organic compound of (2) is not particularly limited. Examples of the conventionally known polymers include polymers such as polyethers, polyesters, polyamides, polyurethanes, polyolefins, polyimides, acrylic polymers, methacrylic polymers, polystyrenes, polycarbonates, polysilicones, poly(halogenated olefins), and polyvinyl alcohols. These polymers may be a polymer having any structure of a homopolymer, a copolymer, a graft copolymer, and a block copolymer.

In the case where an organic compound wherein three or more of the "groups of formulas 1 to 3" are introduced is used as the organic compound of (2) in the production method according to the present invention, a branched structure type polymer, a star polymer, or a graft copolymer can be obtained. Among such organic compounds, a polymerized product of a vinyl monomer wherein three or more of the "groups of formulas 1 to 3" are introduced is preferably used as the organic compound of (2). That is, when a vinyl polymer wherein the "groups of formulas 1 to 3" are introduced is used as the organic compound of (2), a polymer having a structure in which a polymer obtained by polymerizing the monomer of (1) is grafted onto the vinyl polymer being the organic compound of (2), or a bottle brush polymer having a bottle-like structure is produced. By constituting the production method according to the present invention as described above, a useful polymer having unique characteristics can be obtained industrially, simply and inexpensively.

The above-described vinyl polymer wherein the "groups of formulas 1 to 3" are introduced may be obtained by polymerizing a monomer wherein the "groups of formulas 1 to 3" are introduced, or a monomer having a hydroxy group or the like is polymerized in advance, and thereafter the "groups of formulas 1 to 3" may be introduced. In addition, the vinyl polymer wherein the "groups of formulas 1 to 3" are introduced may be a copolymer obtained by copolymerizing a monomer wherein the "groups of formulas 1 to 3" are introduced and another monomer described previously. In this case, the amount to be blended of the monomer wherein the "groups of formulas 1 to 3" are introduced is arbitrary and is not particularly limited.

In addition, the above-described polymer wherein the "groups of formulas 1 to 3" are introduced, which is to be used as the organic compound of (2), is more preferably obtained by living radical polymerization because the molecular weight distribution becomes narrower. Among the methods for performing the living radical polymerization, a nitroxide method (NMP method) in which a nitroxide radical is used; reversible addition/fragmentation chain transfer polymerization (RAFT method) in which a dithioester compound or the like is used; reversible chain transfer catalyzed polymerization (RTCP method) in which an iodine compound and an organic catalyst are used; and the like are used using the monomer wherein the "groups of formulas 1 to 3" are introduced, but the method for performing the living radical polymerization is not particularly limited. However, atom transfer radical polymerization making use of oxidation-reduction is not preferable because there is a possibility that gelation occurs due to polymerization of a monomer and initiation of polymerization from a chloro group or a bromo group.

Furthermore, a polymer can be introduced onto the surface of an article so as to be grafted in such a way that: the monomer wherein the "groups of formulas 1 to 3" are introduced and, as another monomer component, a reactive monomer in particular are used; these are copolymerized; the surface of the article is treated using a resultant copolymer having the reactive group; and thereafter the monomer of (1) is polymerized using the "groups of formulas 1 to 3" that constitute the copolymer as a polymerization initiator. That is, a surface of an article can be modified by a polymer that is introduced so as to be grafted. Further, in the case where the polymerization performed using the monomer wherein the "groups of formulas 1 to 3" are introduced is the living radical polymerization, a dense polymer brush structure in which the chain of the polymer is extended and the molecular weight is uniform can be introduced because the speed of introducing the particular monomer into the copolymer is constant and a termination reaction does not occur.

Specifically, in this case, for example, a polymer component as described below is used as the organic compound of (2). Firstly, the monomer wherein the "groups of formulas 1 to 3" are introduced and an alkoxy silyl group-containing vinyl monomer are copolymerized to use as a polymer component wherein the "groups of formulas 1 to 3" are introduced and the alkoxy silyl groups are contained, this polymer component is applied on the surface of a base material such as glass, a metal, or plastic to modify the surface, thereafter radical polymerization of the monomer of (1) is performed by allowing the "groups of formulas 1 to 3" that characterizes the present invention to function as polymerization initiating groups, and thus the dense brush structure can easily be introduced onto an article.

As described above, in the production method according to the present invention, the organic compound wherein at least one of the "groups of formulas 1 to 3" is introduced can be used as the organic compound of (2). However, more preferably, the compound having two or more of the "groups of formulas 1 to 3" is used. By constituting the organic compound of (2) in this way, polymers having a structure that has never been able to be obtained easily with the conventional techniques can simply be obtained. That is, in the case where one of the "groups of formulas 1 to 3" is introduced, a polymer to be obtained by the production method according to the present invention is a straight chain polymer as described previously. A straight chain polymer can also be obtained by usual radical polymerization or usual living radical polymerization, and therefore the merit in the case of the production method according to the present invention using an organic compound wherein one of the "groups of formulas 1 to 3" is introduced is not so large as that in the case of the production method according to the present invention using an organic compound wherein two or more of the "groups of formulas 1 to 3" are introduced.

In addition, there may a case where the molecular weight of a polymer to be obtained can be controlled by adjusting the amount of the "groups of formulas 1 to 3" to be introduced into the organic compound of (2), and this is also one of the characteristics of the production method according to the present invention. In the production method according to the present invention, polymerization is initiated from the "groups of formulas 1 to 3" introduced in the organic compound of (2), and therefore the molecular weight of a polymer to be produced can be adjusted by adjusting the amount of the monomer of (1) based on 1 mol of the compound containing the "groups of formulas 1 to 3". However, this polymerization is accompanied by a termination reaction that is similar to the termination reaction in radical polymerization, and therefore there is a case where a high-molecular-weight polymer can be produced through coupling. In such a case, the molecular weight cannot be adjusted by the amount of the initiation group. It is to be noted that such a case can be avoided by adding the catalyst described later.

[(3) Iodine Ion-Containing Compound being Iodide Salt or Triiodide Salt]

In the method for producing a polymer according to the present invention, it is essential to use (3) an iodine ion-containing compound being at least one iodide salt or triiodide salt selected from the group consisting of metal iodides, quaternary ammonium iodides, quaternary phosphonium iodides, and quaternary ammonium triiodides. Hereinafter, the compounds will be described. Details on the action of each of these compounds have not been made clear. According to studies conducted by the present inventors, it is considered that by using these compounds, bromine in the previously described "groups of formulas 1 to 3" is replaced with iodine and the polymerization in which iodine transfers occurs. In addition, there is also a possibility that these compounds act as a catalyst for oxidation-reduction to allow the polymerization to progress. Hereinafter, the above-described iodine ion-containing compound is sometimes referred to as "iodizing agent" or compound of (3).

Any of the compounds of (3) is a compound containing an iodine ion and is a compound being at least one iodide salt or triiodide salt selected from the group consisting of metal iodides, quaternary ammonium iodides, quaternary phosphonium iodides, and quaternary ammonium triiodides. Conventionally known compounds among these compounds can be used and are not particularly limited. Specific examples of the metal iodides include lithium iodide, sodium iodide, potassium iodide, calcium iodide, and magnesium iodide. Specific examples of the quaternary ammonium iodides include tetramethylammonium iodide, tetraethylammonium iodide, and tetrabutylammonium iodide. Specific examples of the quaternary phosphonium iodides include tetrabutylphosphonium iodide, tributylmethylphosphonium iodide, and triphenylmethylphosphonium iodide. Specific examples of the quaternary ammonium triiodides include tributylmethylammnoium triiodide. Any compound can be used as long as the compound contains an iodine ion.

In addition, the amount of use of the iodizing agent of (3) is preferably around equimolar to the moles of the "groups of formulas 1 to 3" in the organic compound of (2) to be used together with the iodizing agent of (3); however, the amount of use of the iodizing agent of (3) may be determined according to the polymer intended to be produced and is not particularly limited. For example, when the "groups of formulas 1 to 3" are iodized by adding the iodizing agent of (3) in an amount that is equal to the number of moles of the "groups of formulas 1 to 3" intended to be replaced with iodine, and the polymerization step specified in the present invention is then performed, the number of chains to be polymerized can be adjusted by the amount of the iodizing agent of (3). In addition, the "groups of formulas 1 to 3" left are each a group for initiating the atom transfer radical polymerization being living radical polymerization making use of oxidation-reduction as described previously, and therefore a vinyl-based polymer can be introduced through another polymerization method by performing this atom transfer radical polymerization.

[(4) Iodine; Iodinated Organic Compound that is Capable of Releasing Iodine; or Compound Having Organic Base]

In the production method according to the present invention, when the materials of (1) to (3) described above are used, and these are mixed and warmed, radical polymerization is initiated and progresses to obtain a polymer. According to studies conducted by the present inventors, in addition to the above described materials, any one selected from the group consisting of (4) iodine; iodinated organic compounds that are capable of releasing iodine; and compounds each having an organic base, such as organic amines, is preferably further added as necessary to perform the polymerization step. According to studies conducted by the present inventors, by further adding these components, the previously described termination reaction in the radical polymerization can be prevented, and production of a high-molecular-weight polymer and gelation can be prevented. The action of these components is not clear, but the present inventors consider that iodine or an amino group becomes a radical to contribute to prevention of coupling between propagating radicals. Hereinafter, the component of (4) is sometimes referred to as "catalyst of (4)".

Iodine, iodinated organic compounds that are capable of releasing iodine, and compounds each having an organic base may be used as the catalyst of (4), and conventionally known compounds among such compounds are used and are not particularly limited. The compounds other than iodine are given below as examples. Any compound can be used as the iodinated organic compound that is capable of releasing iodine as long as iodine is bonded to the compound because iodine is released by heat or light. Preferred examples of the iodinated organic compounds that are capable of releasing iodine include N-iodoimide-based compounds, and more preferred examples thereof include N-iodosuccinylimide, N-iodophthalimide, N-iodocyclohexanylimide, 1,3-diiodo-5,5-dimethylhydantoin, and N-iodosaccharin, which are products sold on the market and easily available. In addition, as the compound having an organic base, conventionally known compounds each having an organic base, such as triethylamine, tributylamine, diazabicycloundecene (DBU), diazabicyclooctane (DABCO), and phosphazene bases, can be used.

The amount of these catalysts of (4) is arbitrary and is not particularly limited. The catalyst of (4) is preferably used in a range that is 0.001 mol times to 0.1 mol times the amount of the "groups of formulas 1 to 3", which function as the groups for initiating polymerization, in the organic compound of (2) which is used together with the catalyst. It is not preferable that the amount of use of the catalyst of (4) be too large because the action as a catalyst is exhibited insufficiently and there is a possibility that a side reaction occurs.

[Solvent]

Hereinafter, other materials that can be used in the method for producing a polymer according to the present invention will be described. In the polymerization step of the method for producing a polymer according to the present invention, solution polymerization in which polymerization is performed using an organic solvent is preferable. This is because there is a case where an ionic material such as the compound of (3) cannot be dissolved in the monomer material of (1), and in addition, exchange of chlorine or bromine in the structures of the "groups of formulas 1 to 3" in the organic compound of (2) with the iodine ion in the iodizing agent of (3) needs to be performed by dissolving the iodizing agent as described previously. To achieve these, an organic solvent having a high polarity, the organic solvent given below, is preferably used as part of or the whole of the solvent. Specifically, alcohol-based solvents, glycol-based solvents, amide-based solvents, sulfoxide-based solvents, and solvents each being ionic liquid are preferably used. However, these solvents are not necessarily needed, and, for example, in the case where a monomer that dissolves the iodizing agent is used, polymerization can be performed without using an organic solvent in particular. As organic solvents that are generally used, there are non-polar solvents such as hydrocarbon-based solvents, halogen-based solvents, ketone-based solvents, ester-based solvents, and glycol-based solvents, and a solvent having a high polarity as described above may be used together with these non-polar solvents. In that case, the ratio of the solvent having a high polarity is arbitrary, and solvents are selected so that the polymer according to the present invention obtained by polymerizing the monomer can be dissolved.

As described above, conventionally known solvents can be used, and examples of the preferred solvents include alcohol-based solvents, glycol-based solvents, amide-based solvents, sulfoxide-based solvents, and ionic liquids. Specific examples of the solvents include: alcohol-based solvents such as methanol, ethanol, and isopropanol; glycol-based solvents such as ethylene glycol, propylene glycol, glycerin, diethylene glycol, and propylene glycol monomethyl ether; amide-based solvents such as dimethylformamide, dimethylacetamide, N-methylpyrrolidone, 3-methoxy-N,N-dimethylpropaneamide, and 3-butoxy-N,N-dimethylpropaneamide; sulfoxide-based solvents such as dimethyl sulfoxide; and ionic liquids such as imidazolium salts and quaternary ammonium salts, and these solvents can be used singly, or two or more thereof can be used.

The amount of use of these solvents at the time of polymerization may be such that the iodizing agent of (3) can be dissolved and is not particularly limited. The amount of use is preferably 30% to 80% on a mass basis. When the amount of use is less than 30%, there may be a case where the solid content is excessively high to make the viscosity high, and when the amount of use is more than 80%, there may be a case where the monomer concentration is too low to increase the rate of polymerization. The amount of use is more preferably 40% to 70%.

The major characteristic of the method for producing a polymer according to the present invention is that basically, a radical polymerization initiator that produces a radical is not necessary. Up to now, in the case where a monomer having an unsaturated bond is polymerized, polymerization has been performed using a compound that generates a radical, such as an azo-based initiator, a peroxide-based initiator, or a thiol. However, in the production method according to the present invention, polymerization progresses easily by mixing the above described materials of (1) to (3) and heating the resultant mixture without using such a radical polymerization initiator. It is anticipated that a polymer is obtained by the polymerization method according to the present invention even though the radical polymerization initiator is used together with the monomer depending on circumstances. However, in that case, there may a case where polymerization is also initiated from the radical polymerization initiator, and therefore it is not preferable to use the radical polymerization initiator in light of the purpose of obtaining a desired polymer having a complicated structure. Thus, in the production method according to the present invention, polymerization is preferably performed without using a radical polymerization initiator. That is, radical polymerization is initiated from the structure of the "groups of formulas 1 to 3", and therefore the molecular weight can be controlled by the amount of the organic compound wherein the "groups of formulas 1 to 3" is introduced and the amount of the iodizing agent for conversion, and a polymer derived from a radical polymerization initiator is not produced, so that usual radical polymerization is controlled and only a polymer using the "groups of formulas 1 to 3" can be obtained.

[Polymerization Step]

The materials necessary in the method for producing a polymer according to the present invention are described above, and in the present invention, when these materials are mixed and warmed (heated), radical polymerization is initiated from the "groups of formulas 1 to 3", and the radical polymerization progresses, so that a polymer can be obtained. The polymerization conditions are not particularly limited, and conventionally known conditions can be adopted. More preferred, specific conditions are given below. Polymerization progresses more preferably under a nitrogen or argon atmosphere, or under nitrogen or argon bubbling because the polymerization is not affected by oxygen under such conditions. In addition, the temperature may be room temperature or higher, for example, 40° C. or higher, but a vast amount of polymerization time is required at around room temperature, and therefore it is suitable to perform polymerization preferably at 60° C. or higher, more preferably at 70° C. or higher in that preferred production time can be realized in practical production. In addition, the stirring speed does not give any influence on polymerization, and light shielding is not necessarily needed. The rate of polymerization is arbitrary, and the monomer may not necessarily be consumed completely.

[Polymer]

In the method for producing a polymer according to the present invention, by preparing and mixing the respective materials previously described and then warming the resultant mixture under the conditions as described above, a polymer can simply be prepared. Moreover, by appropriately designing the form of the radical polymerization initiating group-containing compound of (2) that characterizes the present invention, and, as necessary, further using the catalyst of (4), a desired polymer having a unique (complicated) structure can be obtained industrially and more easily. Specifically, by utilizing the production method according to the present invention, desired polymers having various controlled forms as described below can easily be provided. Examples of the polymers to be provided include linear polymers, AB block polymers, ABA block polymers, branched type polymers, graft polymers, star polymers, dense polymer brushes, and bottle brush polymers.

According to the production method of the present invention using the radical polymerization initiating group-containing compound of (2) that characterizes the present invention, various polymers as described above can be synthesized in such a simple manner that has never existed before. A specific example is as follows: that is, a bottle brush polymer being a dense graft polymer can be synthesized by using conventionally known, commercially available materials without the need for purification, and, depending on circumstances, in one pot. A more specific example is described below. Firstly, glycidyl methacrylate and bromoisobutyric acid are reacted in an amide-based solvent using tetraethylammonium bromide as a catalyst to open a ring of the epoxy group, thereby obtaining as an ester a monomer wherein the "group of formula 3" is introduced. Subsequently, an azo-based initiator is put into the system to perform radical polymerization, or, as another method, iodine, an azo-based initiator, and, as a catalyst, diphenylmethane are put into the system to perform polymerization by reversible chain transfer catalyzed polymerization, thereby producing a polymer being an organic compound of (2) wherein the "group of formula 3" is introduced. Subsequently, tributylammonium iodide as an iodizing agent of (3), a monomer of (1), and, as a preferred embodiment, N-iodosuccinimide as a catalyst of (4) are added to the polymer, and the resultant mixture is mixed and warmed to perform the polymerization step specified in the present invention, and thus a bottle brush can be synthesized in one pot without purifying respective materials.

The polymer obtained in the manner as described above may be used as it is, or the polymer may be added to a poor solvent to cause precipitation for purification and a polymer component thus purified may be used.

The obtained polymer can be used for conventionally known applications, and the applications are not particularly limited. The polymer can be applied to various fields such as, for example, inks, paints, coating, plastics, inkjet inks, color filter materials, energy-related materials, mechanical part-related materials, medical devices, medical materials, and pharmaceutical-related fields.

EXAMPLES

Hereinafter, the present invention will be described in more detail giving Examples, Synthesis Examples, and Comparative Examples; however, the present invention in not limited to these examples. Hereinafter, "part(s)" and "%" in the description are each on a mass basis unless otherwise noted. Hereinafter, the examples on the method for producing a polymer according to the present invention are referred to as Examples, and the examples on the radical polymerization initiating group-containing compound according to the present invention are referred to as Synthesis Examples.

Example 1

In a reaction apparatus to which a stirrer, a reflux condenser, a thermometer, and a nitrogen-introducing tube were attached, 100.0 parts of 3-methoxy-N,N-dimethylpropane-amide (hereinafter, abbreviated as MDPA) as a solvent, 4.0 parts of ethyl 2-bromoisobutyrate as an organic compound of (2), 100.0 parts of methyl methacrylate (hereinafter, abbreviated as MMA) as a monomer of (1), and 3.0 parts of sodium iodide as an iodizing agent of (3) were charged, and the resultant mixture was warmed to 75° C. while nitrogen was bubbling to perform polymerization for 7 hours. The obtained polymer had a rate of polymerization of 95%, a number average molecular weight (hereinafter, abbreviated as Mn) of 7600, and a molecular weight distribution (weight average molecular weight/number average molecular weight, hereinafter, abbreviated as PDI) of 1.87. From the above results, it was ascertained that according to the production method of the present invention, a polymer can be obtained without using an azo-based or peroxide-based radical generator which had conventionally been used.

The rate of polymerization described above was calculated by measuring non-volatile components after drying the solution at 180° C. The rate of polymerization in the examples below was calculated by the same method. In addition, the molecular weight was measured with a gel permeation chromatograph (GPC), the solvent was tetrahydrofuran (THF) unless otherwise noted, and the molecular weight is expressed in terms of polystyrene. The molecular weight was also measured in the same manner in the examples below.

In the reaction system used above, the same operation as described above was performed for both the case where sodium iodide of (3) was not used and the case where ethyl 2-bromobutyrate was not used. However, polymerization did not progress in both cases and a polymer was not able to be obtained. In contrast, when the same operation as described above was performed for each of the case where tetrabutylammonium iodide was used, the case where tributylmethylphosphonium iodide was used, and the case where tetrabutylammonium triiodide was used in place of sodium iodide of (3), it was found that the polymer similar to the one obtained by using sodium iodide can be obtained for any of the cases.

Example 2

Polymerization was performed for 7 hours in the same manner as the polymerization performed in Example 1 further adding 0.2 parts of N-iodosuccinimide (hereinafter, abbreviated as NIS) as a component of (4) specified in the present invention to the system in Example 1. Sampling was conducted at this point of time to find that the rate of polymerization was 68%, the Mn was 5200, and the PDI was 1.43. Thereafter, polymerization was performed for further 5 hours under the same conditions to find that the rate of polymerization reached up to 95%, the Mn was 8700, and the PDI was 1.47. From the comparison with the polymer obtained in Example 1, it was ascertained that by adding an N-iodo-based compound as a catalyst into the system, polymerization is controlled and the particle size distribution of the polymer which is obtained becomes narrow.

Example 3

Polymerization was performed in the same manner as in Example 2 further adding 1.0 part of triethylamine as a compound having an organic base, the compound being a component of (4) specified in the present invention, to the system in Example 2. Sampling was conducted after 7 hours of polymerization to find that the rate of polymerization reached up to 91%, the Mn was 7800, and the PDI was 1.61. From the comparison with Example 2, it was ascertained that the polymerization speed is increased, and from the comparison with Example 1, it was ascertained that a polymer the particle size distribution of which is controlled to some extent can also be obtained in the case where triethylamine was added.

Examples 4 and 5

A polymer was prepared in the same manner as in Example 2 except that the warming condition was changed, and 2.8 parts of ethyl 2-chloroisopropionate was used (Example 4) and 3.3 parts of ethyl 2-bromoisopropionate was used (Example 5) in place of 4.0 parts of ethyl 2-bromoisobutyrate of (2) in the system in Example 2. Polymerization was performed setting the warming condition to 85° C. in Example 4 where ethyl 2-chloroisopropionate was used and to 80° C. in Example 5 where ethyl 2-bromoisopropionate was used. Sampling was conducted after 7 hours of polymerization, and the rate of the polymerization and the molecular weight were measured to find that the rate of polymerization was 82%, the Mn was 7600, and the PDI was 1.65 in the case of Example 4, and the rate of polymerization was 79%, the Mn was 6900, and the PDI was 1.56 in the case of Example 5. From the above results, it was ascertained that each compound used above also functions as a polymerization initiating group.

Synthesis Example 1—Preparation of Radical Polymerization Initiating Group-Containing Polymer The same reaction apparatus as in Example 1 was used, 561.0 parts of MDPA as a solvent, 1.0 part of iodine, 3.7 parts of 2,2'-azobis(4-methoxy-2,4-dimethylvaleronitrile) [trade name: V-70 (hereinafter, abbreviated as V-70), manufactured by FUJIFILM Wako Pure Chemical Corporation] being an azo-based polymerization initiator, and 208.0 parts of 2-hydroxyethyl methacrylate were charged in the reaction apparatus, and 0.113 parts of NIS was added thereto to perform polymerization at 65° C. for 7 hours under nitrogen bubbling. As a result, the rate of polymerization of the obtained polymerized product was almost 100%, and the molecular weight of the polymerized product was measured with a GPC apparatus using a dimethyl sulfoxide solvent to find that the Mn was 18500 and the PDI was 1.35.

Subsequently, 189.5 parts of pyridine was added to the above-described reaction system, and the resultant mixture was cooled to 5° C. in an ice bath. A dropping funnel was charged with 459.8 parts of 2-bromoisobutyric bromide and was attached to the reaction apparatus, and 2-bromoisobutyric bromide was dropped in 3 hours keeping the temperature not to exceed 10° C. The resultant mixture was then left to stand at the temperature for 2 hours. Thereafter, the mixture was warmed to 45° C. to be reacted for 1 hour. The mixture was cooled to room temperature, 561 parts of methanol was then added thereto, and the resultant solution was stirred. Subsequently, 5000 g of methanol was prepared in another container, and the solution was gradually added thereto while being stirred with a disper. A polymer was precipitated to obtain a soft polymer. The polymer was taken out and was washed by being added to a large amount of water while stirring the water with a disper. Subsequently, the polymer was subjected to filtration, washed with water, and was then dried in a fan dryer at 50° C. until a volatile component was not left. As a result, a white powdery solid was obtained.

The white powdery solid obtained by the above-described operation is a polymer wherein the group having a structure of formula 3 ("group of formula 3") specified in the present invention is bonded to a side chain of the polymer, as shown below. It was ascertained by identifying the polymer with an infrared spectrophotometer (IR) and a nuclear magnetic resonance apparatus (NMR) that the white powdery solid is a polymer wherein a plurality of the "groups of formula 3" were introduced in the side chain of the polymer. Hereinafter, this is referred to as an initiating group polymer-1. FIG. 1 shows an IR chart of the initiating group polymer-1, and FIG. 2 shows an NMR chart of the initiating group polymer-1. In addition, the molecular weight of the initiating group polymer-1 was measured with a GPC using a THF solvent to find that the Mn was 26000 and the PDI was 1.41.

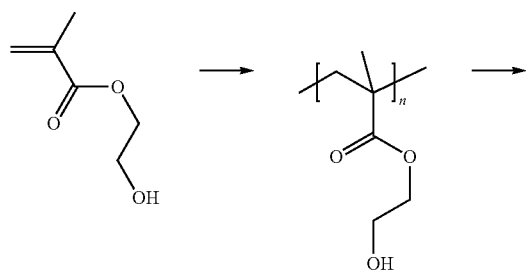

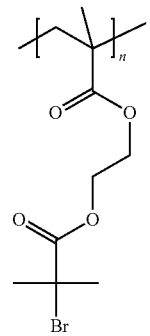

Synthesis Examples 2 and 3—Preparation of Radical Polymerization Initiating Group-Containing Polymer Two types of initiating group polymers each having a different molecular weight were synthesized in the same manner as in Synthesis Example 1 except that the amounts of iodine and V-70 which were used in Synthesis Example 1 were changed. Specifically, the amount of iodine was 1.2 parts and the amount of V-70 was 4.4 parts in Synthesis Example 2, the amount of iodine was 0.75 parts and the amount of V-70 was 2.8 parts in Synthesis Example 3, and the obtained white powdery solids were denoted as an initiating group polymer-2 and an initiating group polymer-3, respectively. The structures of the synthesized products were checked using IR and NMR in the same manner as in Synthesis Example 1. As a result, the polymers were each a polymer wherein the "group of formula 3" is introduced in the side chain of the polymer. In addition, the molecular weights were measured in the same manner as in Synthesis Example 1 to find that the Mn was 14500 and the PDI was 1.38 for the initiating group polymer-2, and the Mn was 31400 and the PDI was 1.55 for the initiating group polymer-3.

Example 6

The same reaction apparatus as in Example 1 was used, 200 parts of MDPA as a solvent, 200 parts of MMA of (1), 6 parts of the initiating group polymer-1 of (2) prepared in Synthesis Example 1, and 7.9 parts of tetrabutylammonium iodide (hereinafter, abbreviated as TBAI) as a compound of (3) were charged in the reaction apparatus, and 0.3 parts of NIS as a component of (4) was added thereto to perform polymerization at 75° C. for 8 hours. Polymerization progressed and a liquid having a high viscosity was produced, and therefore sampling was conducted to measure the rate of polymerization to find that the rate of polymerization was 87%. In addition, the Mn was 2970000, and the PDI was 1.48. From the results, it was ascertained that when polymerization is performed in the manner as described above in the presence of the initiating group polymer-1 wherein the "group of formula 3" is introduced in the side chain of the polymer, the polymer which is obtained is a graft copolymer having a structure in which side chains are present in the main chain and, furthermore, a high-molecular-weight polymer can be obtained.

Examples 7 and 8

Polymerization was performed in the same manner as in Example 6 except that the initiating group polymer-2 was used in Example 7 and the initiating group polymer-3 was used in Example 8 in place of the initiating group polymer-1 used in Example 6. As a result, a polymer obtained by using the initiating group polymer-2 having a smaller molecular weight than the initiating group polymer-1 used in Example 6 had a rate of polymerization of 95%, an Mn of 1870000, and a PDI of 1.45. On the other hand, a polymer obtained by using the initiating group polymer-3 having a larger molecular weight than the initiating group polymer-1 used in Example 6 had a rate of polymerization of 80%, an Mn of 330000, and a PDI of 1.72. From these results, it was ascertained that the molecular weight of a polymer to be obtained finally can be adjusted according to the difference in the molecular weight of an initiating group polymer to be used.

Example 9

Polymerization was performed in the same manner as in Example 6 except that the amount of the initiating group polymer-1 used was changed from 6 parts in Example 6 to 4 parts and 8 parts. As a result, in the case where 4 parts of the initiating group polymer-1 was used, the rate of polymerization was 71%, the Mn was 3210000, and the PDI was 1.56, and in the case where 8 parts of the initiating group polymer-1 was used, the rate of polymerization was 89%, the Mn was 190000 and the PDI was 1.42. From the above results, it was found that the molecular weight of a polymer to be obtained finally can also be adjusted according to the amount of an initiating group polymer, namely the amount of an initiating group.

Comparative Example 1

The same reaction apparatus as in Example 1 was used, 200 parts of MDPA as a solvent, 0.29 parts of copper (I) bromide, 0.52 parts of pentamethyldiethylenetriamine, 6 parts of the initiating group polymer-1 of (2) obtained in Synthesis Example 1, 200 parts of MMA of (1), and 0.22 parts of tin dioctanoate were added, and the resultant mixture was mixed well under nitrogen bubbling. Subsequently, the temperature was raised to 65° C. As a result, the viscosity was increased during warming and gelation occurred, so that polymerization was terminated. It is considered that the reason is as follows, that is, the reaction in this case is atom transfer radical polymerization, and the polymerization progresses by oxidation-reduction, but a termination reaction being a side reaction occurs, and besides, the solid concentration is high, so that the gelation of the polymerized product caused by the multifunctional initiating group polymer was remarkable.

Thus, polymerization was performed reducing the viscosity by increasing the amount of MDPA from 200 parts to 600 parts. Gelation did not occur, and the polymerization progressed even when the temperature reached 65° C. The viscosity became high after 7 hours of polymerization, and sampling was conducted to find that the rate of polymerization was 45%. The sample was dissolved in the THF solvent and was put through a filter of 0.45 µm in order to conduct measurement with the GPC to find that clogging occurred. When the molecular weight of the filtrated solution was measured, the Mn was 5400000 to find that a high-molecular-weight product was produced, and the particle size distribution had two peaks. As understood from the above results, a high-molecular-weight product was produced although the polymerization progressed, and the product was on the brink of gelling. When such a circumstance is brought about, there is a risk that it becomes difficult to use the reaction apparatus and that a dangerous accident or the like occurs, so that such polymerization cannot be utilized industrially. In contrast, as previously shown in Examples 6 to 8, according to the production method of the present invention, a high-molecular-weight, multi-branched type structured polymer can be obtained without gelling even if the reaction system has a high solid content and gives a high rate of polymerization, and therefore the production method of the present invention is a useful method that can be utilized for the purpose of obtaining various polymers industrially.

Examples 10 and 11

Polymerization was performed in the same manner as in Example 6 except that lauryl methacrylate (hereinafter, abbreviated as LMA) was used as a monomer of (1) in Example 10 and cyclohexyl methacrylate (hereinafter, abbreviated as CHMA) was used as a monomer of (1) in Example 11 in place of MMA of (1) used in Example 6. As a result, in Example 10 where LMA was used, a polymer thus obtained had a rate of polymerization of 95%, an Mn of 350000, and a PDI of 1.32. The obtained polymer was precipitated in methanol, and a polymer component was taken out and was then dried to remove methanol to find that the polymer component was a viscous liquid and was in the form of liquid even though the molecular weight was high. In addition, in Example 11 where CHMA was used, a polymer thus obtained had a rate of polymerization of 70%, an Mn of 181000, and a PDI of 1.78. As understood from these results, it was ascertained that the production method according to the present invention is applicable to polymerization of not only MMA but also other methacrylate-based monomers.

Example 12

Polymerization was performed in the same manner as in Example 6 except that butyl acrylate was used in place of MMA of (1) used in Example 6 and the temperature was set at 120° C. As a result, at a point of time of 7 hours of polymerization, the rate of polymerization was 57%, the molecular weight was 114000, and the PDI was 1.89. As understood from the results, it was ascertained that the production method according to the present invention is applicable to polymerization of an acrylate-based monomer.

Synthesis Example 4—Preparation of Radical Polymerization Initiating Group-Containing Polymer The same reaction apparatus as in Example 1 was used, 370.2 parts of propylene glycol monomethyl ether (hereinafter, abbreviated as PGM) as a solvent, 85.1 parts of glycidyl methacrylate, 100 parts of 2-bromoisobutyric acid, 1.0 part of methoxyphenol, and 4.6 parts of tetraethylammonium bromide were mixed, and the resultant mixture was reacted at 90° C. for 8 hours. The acid value of a reaction product obtained was measured to find that the acid value was 0.4 mgKOH/g and 2-bromoisobutyric acid was reacted almost completely. In addition, generation of hydroxy groups and disappearance of epoxy groups were confirmed by IR. From these results, it is understood that the obtained reaction product is a methacrylate which is obtained by reacting the epoxy group in glycidyl methacrylate and the carboxylic acid and in which the "group of formula 3" is introduced.

Subsequently, the solution was cooled to 65° C., a mixture obtained by mixing 185.1 parts of benzyl methacrylate (BzMA) and 5.6 parts of 2,2'-azobis(2,4-dimethylvaleronitrile) (hereinafter, referred to as V-65) in another container and making the resultant mixture uniform was charged in a dropping funnel, one third of the mixture was added to the solution, and the rest was dropped into the solution over one hour. Subsequently, polymerization was continued at the temperature for 7 hours. Sampling was conducted at that point of time to measure the rate of polymerization to find that the rate of polymerization was almost 100% and the non-volatile component was present in an amount of 50.3%. In addition, the Mn was 8900, and the PDI was 2.31. A polymer thus obtained is referred to as an initiating group polymer-4, and a solution of the polymer obtained is referred to as a solution of an initiating group polymer-4.

Example 13

The same reaction apparatus as in Example 1 was used, 194 parts of PGM as a solvent, 100 parts of MMA and 100 parts of butyl methacrylate (BMA) each as a monomer of (1), 12 parts of the solution of the initiating group polymer-4 obtained above, and 7.4 parts of tributylmethylphosphonium iodide of (3) were added to perform polymerization at 80° C. for 7 hours. The solid content measured after polymerization was completed was 96.1%, the Mn was 198000, and the PDI was 2.6. From these results, it was ascertained that a graft polymer can be produced without purifying respective materials and that the initiating group polymer-4 can be used for polymerization even though the initiating group polymer-4 is a random copolymer.

Example 14

The same reaction apparatus as in Example 1 was used, 200 parts of MDPA, 100 parts of MMA of (1), 6 parts of the initiating group polymer-1 of (2) prepared in Synthesis Example 1, and 7.9 parts of TBAI of (3) were charged in the reaction apparatus, and 0.3 parts of NIS and 1 part of triethylamine were each added as a component of (4) thereto to perform polymerization at 75° C. for 5 hours. The polymerization progressed and a liquid having a high viscosity was produced. Sampling was conducted at that point of time to measure the rate of polymerization to find that the rate of polymerization was 68%. In addition, the Mn was 154000, and the PDI was 1.59. Subsequently, 100 parts of polyethylene glycol monomethyl ether methacrylate (molecular weight of about 400, hereinafter, referred to as PME) of (1) was added to perform polymerization for further 6 hours. The molecular weight was measured after the polymerization was completed to find that the Mn was 387000 and the PDI was 2.45, and therefore it was ascertained that the molecular weight was increased from the point of time when the molecular weight was measured previously. From these results, it is inferred that PME, which was added later at the point of time when the rate of polymerization was 68% in the polymerization of MMA, and MMA, which is a residual monomer, were copolymerized to produce a block copolymer, and thus it was found that a block copolymer having a multi-branched structure can be obtained. This polymer, when precipitated in water, became slime-like and spongy.

Synthesis Example 5—Preparation of Radical Polymerization Initiating Group-Containing Polymer Having Alkoxysilyl Group as Reactive Group An initiating group polymer was obtained according to the formulation described below. Into the same reaction apparatus as in Example 1, 50.0 parts of MDPA, 20.8 parts of 2-hydroxyethyl methacrylate, and 18.9 parts of pyridine were added, and the resultant mixture was cooled to 5° C. in an ice bath. A dropping funnel was charged with 45.9 parts of 2-bromoisobutyric bromide and was attached to the apparatus, and 2-bromoisobutyric bromide was dropped in 3 hours keeping the temperature not to exceed 10° C. Subsequently, after the dropping was completed, the resultant mixture was left to stand at the temperature for 2 hours. Thereafter, the mixture was warmed to 45° C. to be reacted for 1 hour. The reaction mixture was cooled to room temperature, thereafter 200 parts of ethyl acetate was added thereto, and subsequently, a large amount of water was added thereto to extract an obtained monomer with a separatory funnel. Subsequently, the monomer was washed with a large amount of water several times and dried with anhydrous magnesium chloride, and the solvent was then removed with an evaporator to obtain 2-(2-bromo-2-methylpropionyloxy)ethyl 2-methacrylate (hereinafter, abbreviated as BMPMA) being a target product using a fractionating apparatus.

Subsequently, the same reaction apparatus as in Example 1 was used, 100 parts of propylene glycol monomethyl ether acetate (hereinafter, abbreviated as PGMAc) was charged in the reaction apparatus and was warmed to 85° C. In another container, a monomer-mixed solution of 80 parts of the BMPMA obtained above, 20 parts of 3-methacryloxy propyl triethoxy silane, 3 parts of dimethyl 2,2'-azobis(isobutyrate) (V-601) and 100 parts of PGMAc was prepared. One third of the monomer-mixed solution described above was added using a dropping apparatus into the reaction apparatus charged with PGMAc, and subsequently, the rest of the solution was dropped over 3 hours. Subsequently, polymerization was performed at a temperature of 85° C. for 7 hours to obtain a polymerized product having a rate of polymerization of almost 100%, an Mn of 12000, and a PDI of 2.21. Subsequently, the polymerized product obtained was cooled, and PGMAc was added thereto to obtain a solution of a polymer, the solution having a solid concentration of 5%. This polymer is an initiating group polymer-5 having the "group of formula 3" that functions as a polymerization initiating group and having an alkoxysilyl group as a reactive group. This solution is referred to as a solution of an initiating group polymer-5.

Example 15

An initiating group polymer-mixed solution was prepared by mixing: 10 parts of the solution of the initiating group polymer-5 which was obtained in Synthesis Example 5 and which has an alkoxysilyl group as a reactive group; 10 parts of ethanol; and 2 g of a 25% ammonia water. Subsequently, a silicon substrate cut out in 5 cm square was prepared, and one surface (hereinafter, referred to as front face) of the substrate was spin-coated with the above-described initiating group polymer-mixed solution using a spin coater. Thereafter, the initiating group polymer-mixed solution on the surface of the substrate was dried at 80° C. for 10 minutes and then at 150° C. for 10 minutes to be baked. As a result, the polymerization initiating group was introduced surely at the front face of the silicon substrate. That is, with respect to the substrate obtained in the manner as described above, a group for initiating polymerization exists at the front face of the substrate in the form of a polymer film in which the polymer exists in a high-concentration state, and the alkoxysilyl group is firmly bonded to the silicon substrate.

Subsequently, in the same reaction apparatus as used in Example 1, the above-obtained silicon substrate, 100.0 parts of MDPA as a solvent, 0.04 parts of ethyl 2-bromoisobutyrate of (2), 100.0 parts of MMA of (1), and 1 part of TBAI of (3) were charged, and the resultant mixture was warmed to 75° C. under nitrogen bubbling to perform polymerization for 14 hours. After the reaction was completed, the silicon substrate was taken out, and it was found that a polymer-treated silicon substrate which contains polymethyl methacrylate (PMMA) grafted onto the front face of the substrate wherein the polymerization initiating group had been introduced can be obtained. The polymer obtained using ethyl 2-bromoisobutyrate that functions as a polymerization initiating group had an Mn of 28700 and a PDI of 1.67, and it is considered that this polymer is introduced at the surface of the silicon substrate. When the method according to the present invention is utilized, a polymer brush can be grafted in an extremely simple manner onto a surface of substrates made from various materials, and a surface of a material can be modified variously. Therefore, the use of the method according to the present invention is expected.

Example 16: Synthesis-1 of Multi-Branched Polymer

The same reaction apparatus as in Example 1 was used, 100.0 parts of MDPA as a solvent, 1.83 parts of pentaerythritol tetrakis(2-bromoisobutyrate) having four polymerization initiating groups as an organic compound of (2), 100.0 parts of MMA of (1), and 4.1 parts of TBAI of (3) were charged in the reaction apparatus, the resultant mixture was warmed to 75° C. under nitrogen bubbling, and subsequently, 0.74 parts of triethylamine of (4) was added thereto to perform polymerization for 7 hours. A polymer thus obtained had a rate of polymerization of 94.8%, an Mn of 26000, and a PDI of 1.49. From these results, it was ascertained that a multi-branched polymer having four chains can be obtained.

Example 17: Synthesis-2 of Multi-Branched Polymer

The same reaction apparatus as in Example 1 was used, 100.0 parts of MDPA as a solvent, 1.91 parts of dipentaerythritol hexakis (2-bromoisobutyrate) having six polymerization initiating groups as an organic compound of (2), 100.0 parts of MMA of (1), 4.1 parts of TBAI of (3) were charged in the reaction apparatus, and the resultant mixture was warmed to 75° C. under nitrogen bubbling, and subsequently, 0.74 parts of triethylamine of (4) was added thereto to perform polymerization for 7 hours. A polymer thus obtained had a rate of polymerization of 93.3%, an Mn of 44500, and a PDI of 1.46. From these results, it was ascertained that a multi-branched polymer having six chains can be obtained.

Synthesis Example 6—Preparation of Radical Polymerization Initiating Group-Containing Polymer An initiating group polymer was obtained according to the formulation described below. Into the same reaction apparatus as in Example 1, 50.0 parts of MDPA as a solvent, 25.9 parts of 4-tert-butylcalix[8] arene, and 18.9 parts of pyridine were added, and the resultant mixture was cooled to 5° C. in an ice bath. A dropping funnel was charged with 45.9 parts of 2-bromoisobutyric bromide and was attached to the apparatus, and 2-bromoisobutyric bromide was dropped in 3 hours keeping the temperature not to exceed 10° C. Subsequently, after the dropping was completed, the resultant mixture was left to stand at the temperature for 2 hours. Thereafter, the mixture was warmed to 45° C. to be reacted for 1 hour. The reaction mixture was cooled to room temperature, thereafter 200 parts of ethyl acetate was added thereto, and subsequently, a large amount of water was added thereto to extract an obtained monomer with a separatory funnel. Subsequently, the monomer was washed with a large amount of water several times and dried with anhydrous magnesium chloride, and the solvent was then removed with an evaporator to obtain a compound in which all the hydroxy groups in 4-tert-butylcalix[8] arene are replaced with a 2-bromoisobutyryl group, the compound having eight polymerization initiating groups and being a target product, using a fractionating apparatus. This compound is referred to as C8AMA.

Example 18: Synthesis-3 of Multi-Branched Polymer

The same reaction apparatus as in Example 1 was used, 100.0 parts of MDPA as a solvent, 3.1 parts of C8AMA having eight polymerization initiating groups, which was obtained in Synthesis Example 6, as an organic compound of (2), 100.0 parts of MMA of (1), and 4.1 parts of TBAI of (3) were charged in the reaction apparatus, the resultant mixture was warmed to 75° C. under nitrogen bubbling, and subsequently, 0.74 parts of triethylamine of (4) was added thereto to perform polymerization for 7 hours. A polymer thus obtained had a rate of polymerization of 91.1%, an Mn of 63600, and a PDI of 1.49. From these results, it was ascertained that a multi-branched polymer having eight chains can be obtained.

INDUSTRIAL APPLICABILITY

As an utilization example of the present invention, innovative development of technology brought about by providing materials into fields where the materials have not been able to be used can be expected because when a radical polymerization initiating group-containing compound that can be made into various forms is used, there is provided a novel polymerization method by which polymers having various structures can be produced industrially and simply by initiating radical polymerization accompanied by a termination reaction and allowing the radical polymerization to progress without using a conventional radical polymerization initiator. Specifically, polymer materials having unique characteristics, such as an adhesive property, a friction characteristic, wear resistance, wettability, a barrier property, and adsorption/separation/transportation properties for a particular substance, and various materials in which the surface of a base material is treated with such a polymer having unique characteristics are provided, and the utilization of these materials are expected.

The invention claimed is:

1. A method for producing a polymer, the method comprising radical polymerization of a radically polymerizable monomer by mixing and warming a composition,
   wherein the composition comprises:
   (1) the radically polymerizable monomer having an unsaturated bond;
   (2) an organic compound having at least one functional group that functions as group for initiating the radical polymerization of the radically polymerizable monomer,
       wherein the at least one functional group has a structure represented by following formula [1] or following formula [2] and is introduced in a molecule of the organic compound; and
   (3) an iodine ion-containing compound being at least one iodide salt or at least one triiodide salt selected from the group consisting of metal iodides, quaternary ammonium iodides, quaternary phosphonium iodides, and quaternary ammonium triiodides; and
   (4) at least one material selected from the group consisting of iodine, iodinated organic compounds capable of releasing iodine, and compounds each having an organic base,
   wherein the radical polymerization is accompanied by a termination reaction and is initiated by the at least one functional group,
   the metal iodides in the group for the iodine ion-containing compound (3) are lithium iodide, sodium iodide, potassium iodide, calcium iodide, and magnesium iodide,
   the iodinated organic compounds capable of releasing iodine are N-iodoimide-based compounds, and the compounds each having an organic base are triethylamine, tributylamine, diazabicycloundecene, diazabicyclooctane, and phosphazene bases,
   the at least one material (4) is present in amount at a ratio of the at least one material (4) relative to a total amount of the functional group of formula [1] and the functional group of formula [2] in the organic compound (2) being in a range from 0.001 to 0.1 (mol/mol), and
   the method does not use a metal catalyst used in living radical polymerization,

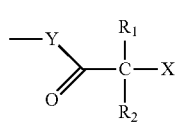

wherein, $R_1$ represents H, an alkyl group, an acyl group, or a phenyl group, $R_2$ represents an alkyl group or an aryl group, X represents Cl or Br, and Y represents O or NH, and

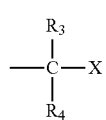

wherein $R_3$ represents H, an alkyl group, or an aryl group, $R_4$ represents an aryl group, a cyano group, a carboxyl group, an ester group, or an amide group, and X represents Cl or Br.

2. The method for producing a polymer according to claim 1,
   wherein the radical polymerization is performed without using any initiator selected from the group consisting of azo-based radical polymerization initiators, peroxide-based radical polymerization initiators, and photo-radical polymerization initiators.

3. The method for producing a polymer according to claim 1,
   wherein an organic solvent is further used during the radical polymerization.

4. The method for producing a polymer according to claim 3,
   wherein the organic solvent is at least one solvent selected from the group consisting of alcohol-based solvents, glycol-based solvents, amide-based solvents, sulfoxide-based solvents, and ionic liquids.

5. The method for producing a polymer according to claim 1,
   wherein the N-iodoimide-based compounds are N-iodosuccinimide, N-iodophthalimide, N-iodocyclohexanylimide, 1,3-diiodo-5,5-dimethylhydantoin, and N-iodosaccharin.

6. The method for producing a polymer according to claim 1,
   wherein the group having the structure represented by the formula [1] is a group having a structure represented by following formula [3]:

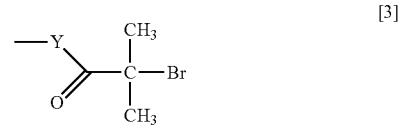

wherein Y represents 0 or NH.

7. The method for producing a polymer according to claim 1,
   wherein the organic compound (2) is a polymerization initiating group-containing polymer,
   two groups each having the structure represented by the formula [1] or the formula [2] are introduced in a molecule of the polymerization initiating group-containing polymer, and
   the polymer to be obtained in the radical polymerization is a polymer having a block structure or a comb-shaped structure.

8. The method for producing a polymer according to claim 1,
   wherein the organic compound (2) is a compound in a molecule of which three or more groups each having the structure represented by the formula [1] or the formula [2] are introduced, and
   the polymer to be obtained in the radical polymerization is a polymer having a branched structure, a star polymer, or a graft copolymer.

9. The method for producing a polymer according to claim 1,
   wherein the organic compound (2) is a vinyl polymer in a molecule of which three or more groups each having a structure represented by the formula [1] or the formula [2] are introduced, and
   the polymer to be obtained in the radical polymerization is (a) a polymer having a structure in which a polymer of the monomer (1) is grafted onto the vinyl polymer, or (b) a bottle brush polymer.

10. The method for producing a polymer according to claim 1,
wherein the organic compound (2) is a copolymer of a monomer in a molecule of which at least one group having the structure represented by the formula [1] or the formula [2] is introduced and a monomer having a reactive group that bonds to a surface of a base material,
the surface of the base material is treated with the copolymer so as to modify the surface of the base material, and thereafter the monomer (1) and the iodine ion-containing compound (3) are mixed and warmed on the modified surface of the base material, thereby producing the polymer on the surface of the base material, and
the obtained polymer has a dense brush structure.

11. The method for producing a polymer according to claim 1,
wherein a temperature of the radical polymerization is in a range from 40° C. to 120° C.

12. A method for producing a polymer, the method comprising radical polymerization of a radically polymerizable monomer by mixing and warming a composition,
wherein the composition comprises:
(1) the radically polymerizable monomer having an unsaturated bond;
(2) an organic compound having at least one functional group that functions as group for initiating the radical polymerization of the radically polymerizable monomer,
wherein the at least one functional group has a structure represented by following formula [1] or following formula [2] and is introduced in a molecule of the organic compound; and
(3) an iodine ion-containing compound comprising at least one salt of quaternary ammonium triiodides; and
(4) at least one material selected from the group consisting of iodine, iodinated organic compounds capable of releasing iodine, and compounds each having an organic base,
wherein the radical polymerization is accompanied by a termination reaction and is initiated by the at least one functional group,
the iodinated organic compounds capable of releasing iodine are N-iodoimide-based compounds,
the compounds each having an organic base are triethylamine, tributylamine, diazabicycloundecene, diazabicyclooctane, and phosphazene bases,
the at least one material (4) is present in amount at a ratio of the at least one material (4) relative to a total amount of the functional group of formula [1] and the functional group of formula [2] in the organic compound (2) being in a range from 0.001 to 0.1 (mol/mol), and
the method does not use a metal catalyst used in living radical polymerization,

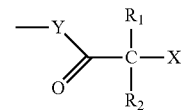

[1]

wherein, $R_1$ represents H, an alkyl group, an acyl group, or a phenyl group, $R_2$ represents an alkyl group or an aryl group, X represents Cl or Br, and Y represents O or NH, and

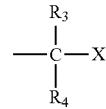

[2]

wherein $R_3$ represents H, an alkyl group, or an aryl group, $R_4$ represents an aryl group, a cyano group, a carboxyl group, an ester group, or an amide group, and X represents Cl or Br.

* * * * *